(12) United States Patent
Ohta

(10) Patent No.: US 9,696,555 B2
(45) Date of Patent: Jul. 4, 2017

(54) COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(71) Applicant: NINTENDO CO., LTD., Kyoto (JP)

(72) Inventor: Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 361 days.

(21) Appl. No.: 14/140,923

(22) Filed: Dec. 26, 2013

(65) Prior Publication Data

US 2014/0104684 A1 Apr. 17, 2014

Related U.S. Application Data

(63) Continuation of application No. 13/007,038, filed on Jan. 14, 2011, now Pat. No. 9,128,293.

(30) Foreign Application Priority Data

Jan. 14, 2010 (JP) ................................ 2010-005955

(51) Int. Cl.
*H04N 13/02* (2006.01)
*G02B 27/22* (2006.01)
(Continued)

(52) U.S. Cl.
CPC ...... *G02B 27/2214* (2013.01); *A63F 13/2145* (2014.09); *A63F 13/26* (2014.09);
(Continued)

(58) Field of Classification Search
CPC .. G02B 27/2214; A63F 13/5252; A63F 13/63; A63F 13/2145; A63F 13/26;
(Continued)

(56) References Cited

U.S. PATENT DOCUMENTS 5,740,802 A 4/1998 Nafis et al.
7,843,429 B2 11/2010 Pryor
(Continued)

FOREIGN PATENT DOCUMENTS

JP 9-74573 3/1997
JP H09-074573 3/1997
(Continued)

OTHER PUBLICATIONS

Office Action (30 pgs.) dated Sep. 11, 2014 issued in co-pending U.S. Appl. No. 13/007,038.
(Continued)

*Primary Examiner* — Jared Walker
(74) *Attorney, Agent, or Firm* — Nixon & Vanderhye PC

(57) ABSTRACT

An image display apparatus includes a stereoscopic image display apparatus configured to display a stereoscopically visible image, and a planar image display apparatus configured to display a planar image. An adjustment section of the image display apparatus adjusts relative positions, relative sizes, and relative rotations of a left-eye image taken by a left-eye image imaging section and a right-eye image taken by a right-eye image imaging section. The adjusted left-eye image and the adjusted right-eye image are viewed by the left eye and the right eye of the user, respectively, thereby displaying the stereoscopic image on the stereoscopic image display apparatus. The adjusted left-eye image and the adjusted right-eye image are made semi-transparent and superimposed one on the other, and thus a resulting superimposed planar image is displayed on the planar image display apparatus.

26 Claims, 21 Drawing Sheets

(51) Int. Cl.
*G06F 1/16* (2006.01)
*G06F 3/0489* (2013.01)
*H04N 13/00* (2006.01)
*H04N 13/04* (2006.01)
*A63F 13/26* (2014.01)
*A63F 13/5252* (2014.01)
*A63F 13/63* (2014.01)
*A63F 13/2145* (2014.01)

(52) U.S. Cl.
CPC .......... *A63F 13/5252* (2014.09); *A63F 13/63* (2014.09); *G06F 1/1637* (2013.01); *G06F 3/04897* (2013.01); *H04N 13/0022* (2013.01); *H04N 13/0497* (2013.01)

(58) Field of Classification Search
CPC .............. G06F 1/1637; G06F 3/04897; H04N 13/0022; H04N 13/0497; H04N 13/04; H04N 13/0402; H04N 13/0409; H04N 13/0411; H04N 13/0412
USPC ...................................... 348/46–60
See application file for complete search history.

(56) References Cited

U.S. PATENT DOCUMENTS

| | | | | |
|---|---|---|---|---|
| 2001/0033327 | A1* | 10/2001 | Uomori | H04N 13/0278 348/47 |
| 2002/0008906 | A1 | 1/2002 | Tomita | |
| 2003/0174204 | A1 | 9/2003 | Otani et al. | |
| 2004/0066555 | A1* | 4/2004 | Nomura | G02B 27/2228 359/462 |
| 2005/0078108 | A1 | 4/2005 | Swift et al. | |
| 2006/0119597 | A1 | 6/2006 | Oshino | |
| 2006/0192776 | A1* | 8/2006 | Nomura | H04N 13/0022 345/419 |
| 2007/0111803 | A1* | 5/2007 | Moro | A63F 13/06 463/43 |
| 2008/0037863 | A1* | 2/2008 | Tooyama | H04N 13/0011 382/154 |
| 2008/0199046 | A1 | 8/2008 | Sasagawa et al. | |
| 2008/0225007 | A1 | 9/2008 | Nakadaira et al. | |
| 2008/0240549 | A1 | 10/2008 | Koo et al. | |
| 2009/0275366 | A1 | 11/2009 | Schilling | |
| 2009/0278764 | A1 | 11/2009 | Kuwahara et al. | |
| 2009/0295743 | A1 | 12/2009 | Nakajoh | |
| 2011/0221866 | A1 | 9/2011 | Ohta | |
| 2011/0225538 | A1 | 9/2011 | Oyagi | |
| 2012/0108328 | A1 | 5/2012 | Konno | |
| 2012/0154377 | A1 | 6/2012 | Sato | |

FOREIGN PATENT DOCUMENTS

| | | |
|---|---|---|
| JP | 09-192349 | 7/1997 |
| JP | 09-201472 | 8/1997 |
| JP | 2002-223458 | 8/2002 |
| JP | 2002-281526 | 9/2002 |
| JP | 2003-107603 | 4/2003 |
| JP | 2003-264851 | 9/2003 |
| JP | 2003-348621 | 12/2003 |
| JP | 2004-287902 | 10/2004 |
| JP | 2005-218779 | 8/2005 |
| JP | 2006-33476 | 2/2006 |
| JP | 2007-256960 | 10/2007 |
| JP | 4358181 | 8/2009 |
| WO | 2008/013352 | 1/2008 |

OTHER PUBLICATIONS

Explanation of Circumstances concerning Accelerated Examination in Japanese Application No. 2011-68400 dated Apr. 18, 2011.
Jun. 8, 2012 Office Action in U.S. Appl. No. 13/006,055, 10 pages.
Oct. 1, 2012, European Search Report for EP 11150625.9, 9 pages.

* cited by examiner

COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

This is a continuation of U.S. application Ser. No. 13/007,038, filed Jan. 14, 2011, which claims priority to Japanese Patent Application No. 2010-005955, filed on Jan. 14, 2010, the disclosures of both of which are incorporated herein by reference.

BACKGROUND OF THE INVENTION

Field of the Invention

The present invention relates to a display control program, a display control apparatus, a display control system, and a display control method, for adjusting a three-dimensional appearance when a stereoscopic image is displayed on a display device capable of displaying a stereoscopically visible image.

Description of the Background Art

Conventionally, there have been stereoscopic image display apparatuses which display stereoscopic images by using a right-eye image and a left-eye image having a parallax therebetween. Specifically, in the stereoscopic image display apparatuses, an image having a stereoscopic effect is displayed on a screen, by causing a user to view the right-eye image with his/her right eye, and the left-eye image with his/her left eye. In such stereoscopic image display apparatuses, there are devices which adjust the stereoscopic effect of the displayed image. For example, Japanese Laid-Open Patent Publication No. 2003-264851 (hereinafter, referred to as Patent Literature 1) discloses an apparatus which adjusts a stereoscopic effect of a displayed image by adjusting respective positions, sizes, and rotations of right-eye and left-eye images on a display screen, which are taken. Specifically, in the apparatus disclosed in Patent Literature 1, the right-eye image and the left-eye image are superimposed one on the other to be displayed on one screen, and the user adjusts the respective positions and rotations of the two images displayed on the one screen. After the adjustment of the two images, the user displays the two images as a stereoscopic image and verifies the stereoscopic effect of the image.

The apparatus disclosed in Patent Literature 1, however, does not allow the user to adjust the respective positions and rotations of the right-eye and left-eye images while the images are being stereoscopically displayed on the screen. That is, with the apparatus disclosed in Patent Literature 1, the user adjusts the respective positions, and the like, of the two images superimposed one on the other in a planar manner and displayed on the screen, and thereafter displays the two images stereoscopically to verify the stereoscopic effect of a resulting image. Thus, the user cannot verify the stereoscopic effect of the stereoscopically displayed image during the adjustment of the superimposed two images. On the other hand, in the state in which the images are stereoscopically displayed on the screen, the user needs to make adjustment of the two superimposed images in a situation in which the stereoscopic display is poorly visible and additionally, it is difficult for the user to view the two images individually. Therefore, it is difficult to make adjustments while the images are being displayed stereoscopically on the screen.

SUMMARY OF THE INVENTION

Therefore, an object of the present invention is to provide a display control apparatus, a display control program, and a display control system, which allow the user to easily adjust the stereoscopic effect of the image.

In order to achieve the object, the present invention employs the following features.

An embodiment of the present invention is a display control program executed by a computer of a display control apparatus for displaying a stereoscopic image on first display means configured to display a stereoscopically visible image by using a right-eye image and a left-eye image which have a parallax therebetween. The display control program causes the computer to function as: adjustment means, first display control means, and second display control means. The adjustment means adjusts at least one of relative positions, relative sizes, and relative rotations of the right-eye image and the left-eye image. The first display control means displays on the first display means the right-eye image adjusted by the adjustment means and the left-eye image adjusted by the adjustment means so as to be viewed with a right eye and a left eye of the user, respectively, to display the stereoscopic image on the first display means. The second display control means superimposes the right-eye image adjusted by the adjustment means and the left-eye image adjusted by the adjustment means one on the other, and displaying a resulting superimposed planar image on a second display means configured to display a planar image.

According to the above configuration, the stereoscopic image can be displayed on the first display means by using the right-eye image and the left-eye image, and the planar image in which the right-eye image and the left-eye image are superimposed one on the other can be displayed on the second display means. Furthermore, respective positions, respective sizes and respective rotations of the right-eye image and the left-eye image can be adjusted. This allows the user to adjust the respective positions, the respective sizes, and the respective rotations of the right-eye image and the left-eye image which are displayed on the second display means, while seeing the stereoscopic image displayed on the first display means.

Further, in another embodiment of the present invention, in the case where the right-eye image adjusted by the adjustment means and the left-eye image adjusted by the adjustment means are superimposed one on the other, the first display control means displays on the first display means merely a superimposed area, which is a superimposed portion of the right-eye image adjusted by the adjustment means and the left-eye image adjusted by the adjustment means, of the stereoscopic image. In this case, the second display control means displays on the second display means a non-overlapping area which is a portion where the right-eye image and the left-eye image are not superimposed one on the other, in addition to the superimposed area of the right-eye image and the left-eye image which are adjusted by the adjustment means.

According to the above configuration, the user can adjust the stereoscopic image displayed on the first display means, while verifying the portion, in which the right-eye image and the left-eye image are superimposed one on the other, and the portion, in which the right-eye image and the left-eye image are not superimposed one on the other, which are displayed on the second display means. Since only the portion in which the right-eye image and the left-eye image are superimposed one on the other is displayed on the first display means, the stereoscopic image displayed on the first display means causes no sense of discomfort. On the other hand, since the superimposed portion and the non-overlapping portion are displayed on the second display means, the user can easily understand the positional relationship of an object to be imaged, which is displayed on the two images. In addition, for example, even if an object to be imaged, which is desired by the user to view, is present in the non-overlapping portion, the user can easily adjust the right-eye image and the left-eye image, while seeing the images displayed on the second display means.

Further, in another embodiment of the present invention, the first display control means may perform zoom the stereoscopic image by changing the respective sizes of the right-eye image and the left-eye image.

According to the above configuration, the stereoscopic image displayed on the first display means can be zoomed.

Further, in another embodiment of the present invention, the first display control means may scroll the stereoscopic image by changing the respective positions of the right-eye image and the left-eye image.

According to the above configuration, the stereoscopic image displayed on the first display means can be scrolled.

Further, in another embodiment of the present invention, when the first display control means scrolls or zooms the stereoscopic image, the second display control means may display on the second display means an entirety of the right-eye image and an entirety of the left-eye image.

According to the above configuration, even when the stereoscopic image displayed on the first display means is zoomed or scrolled, the entirety of the right-eye image and the entirety of the left-eye image can be displayed on the second display means. This allows the user to verify on the second display means the entirety of the right-eye image and the entirety of the left-eye image, even when merely a portion of the stereoscopic image is displayed on the first display means because of the stereoscopic image being zoomed or scrolled.

Further, in another embodiment of the present invention, in the case where a portion of the stereoscopic image is displayed on the first display means by performing zooming or scrolling of the stereoscopic image by the first display control means, the second display control means may display on the second display means a stereoscopic image display frame indicative of respective areas of the right-eye image and the left-eye image which correspond to the portion of the stereoscopic image. Here, the stereoscopic image display frame indicates respective areas of the right-eye image and the left-eye image, which correspond to the portion of the stereoscopic image.

According to the above configuration, the user can easily recognize which areas of the right-eye image and the left-eye image displayed on the second display means are displayed on the first display means as the stereoscopic image. That is, when merely the portion of the stereoscopic image is displayed on the first display means because of the stereoscopic image being zoomed or scrolled, it may be difficult for the user to recognize which areas are displayed stereoscopically. However, displaying the stereoscopic image display frame on the second display means allows the user to easily recognize which areas, among the entirety of right-eye and left-eye images, are displayed.

Further, in another embodiment of the present invention, designated coordinate detection means for detecting a designated coordinate corresponding to a display position on the second display means may be connected to the display control apparatus. In this case, display control program further causes the computer to function as first adjustment bar control means. The first adjustment bar control means displays a first adjustment bar on the second display means, and adjusts a slider of the first adjustment bar, according to the designated coordinate detected by the designated coordinate detection means. Then, the adjustment means adjusts at least one of the relative positions, the relative sizes, and the relative rotations of the right-eye image and the left-eye image, according to a position of the slider, of the first adjustment bar, which is adjusted by the first adjustment bar control means.

According to the above configuration, the user can adjust the relative positions, the relative sizes, and the relative rotations of the right-eye image and the left-eye image by adjusting the first adjustment bar displayed on the screen by using the designated coordinate detection means. For example, the user can adjust the right-eye image and the left-eye image by using a touch panel. This allows the user to adjust the appearance of the stereoscopic image by performing an intuitive operation.

Further, in another embodiment of the present invention, the display control program may further cause the computer to function as second adjustment bar control means. The second adjustment bar control means displays a second adjustment bar on the second display means, and adjusts a slider of the second adjustment bar, according to the designated coordinate detected by the designated coordinate detection means. The first display control means zooms the stereoscopic image, according to a position of the slider, of the second adjustment bar, which is adjusted the second adjustment bar control means.

According to the above configuration, the user adjusts the second adjustment bar displayed on the screen by using the designated coordinate detection means, thereby zooming the stereoscopic image displayed on the first display means.

Further, in another embodiment of the present invention, the display control program may further cause the computer to function as direction detection means. The direction detection means detects a direction inputted by the user, based on the designated coordinate detected by the designated coordinate detection means. The first display control means scrolls the stereoscopic image, based on the direction detected by the direction detection means.

According to the above configuration, by using the designated coordinate detection means, the direction inputted by the user can be detected. Then, the stereoscopic image can be scrolled, based on the detected direction. This allows the user to easily scroll the stereoscopic image by using the designated coordinate detection means.

Further, in another embodiment of the present invention, the second display control means may set in the second display means an image display area for displaying therein the right-eye image and the left-eye image. In this case, a ratio of a width in an aspect ratio of the image display area is larger than a ratio of a width in an aspect ratio of each of the right-eye image and the left-eye image.

According to the above configuration, the width of the image display area can be set longer than that of each of the right-eye image and the left-eye image. This allows the entirety of each of the right-eye image and the left-eye image to be displayed on the screen, for example, even when the respective positions of the right-eye image and the left-eye image are adjusted in the horizontal direction of the screen. Therefore, the user can easily adjust the stereoscopic image in the horizontal direction.

Further, in another embodiment of the present invention, designated coordinate detection means for detecting a designated coordinate corresponding to a display position on the second display means may be connected to the display control apparatus. The display control program further causes the computer to function as first adjustment bar control means. The first adjustment bar control means displays a first adjustment bar having a slider configured to move in the horizontal direction of a screen of the second display means in an area, on the screen of the second display means, which is different from the image display area, and adjusts the slider, according to the designated coordinate detected by the designated coordinate detection means. The adjustment means shifts the right-eye image and/or the left-eye image in the horizontal direction, according to a position of the slider adjusted by the first adjustment bar control means.

According to the above configuration, the user can shift the position of the right-eye image and/or the position of the left-eye image by using the first adjustment bar. This allows the user to adjust the position of the right-eye image and/or the position of the left-eye image by performing the intuitive operation, and easily adjust the appearance of the stereoscopic image. Furthermore, since the image display area is a screen elongated in the horizontal direction, the user can recognize the entirety of each of the right-eye image and the left-eye image even if the right-eye image and/or the left-eye image are shifted in the horizontal direction of the screen.

Further, in another embodiment of the present invention, designated coordinate detection means for detecting a designated coordinate corresponding to a display position on the second display means may be connected to the display control apparatus. The display control program further causes the computer to function as first adjustment bar control means. The first adjustment bar control means displays on the second display means a first adjustment bar having a slider configured to move in the horizontal direction of a screen of the second display means, and adjusts a position of the slider of the first adjustment bar, according to the designated coordinate detected by the designated coordinate detection means. Further, in accordance with the designated coordinate detected by the designated coordinate detection means, the first adjustment bar control means moves the first adjustment bar itself in the vertical direction of the screen of the second display means within a range smaller than a range of movement of the slider. In the case where the slider is moved by the first adjustment bar control means in the horizontal direction, the adjustment means shifts the position of the right-eye image and/or the position of the left-eye image in the horizontal direction, according to an amount of movement of the slider. Furthermore, in the case where the first adjustment bar is moved by the first adjustment bar control means in the vertical direction, the adjustment means shifts the position of the right-eye image and/or the position of the left-eye image in the vertical direction, according to an amount of movement of the first adjustment bar.

According to the above configuration, the user can shift the right-eye image and/or the left-eye image in the horizontal and vertical directions by using the first adjustment bar. Also, the range of movement of the first adjustment bar in the vertical direction is set to be narrow as compared to the range of movement, in the horizontal direction, of the slider of the first adjustment bar. The right-eye image and/or the left-eye image are shifted in the horizontal direction, according to an amount of movement in the horizontal direction of the slider of the first adjustment bar. Also, the right-eye image and/or the left-eye image are shifted in the vertical direction, according to the amount of movement in the vertical direction of the first adjustment bar. Therefore, it is easy for the user to adjust the position of the right-eye image and/or the position of the left-eye image in the horizontal direction by performing the intuitive operation. In addition, the user can make fine adjustment on the position of the right-eye image and/or the position of the left-eye image in the vertical direction.

Further, in another embodiment of the present invention, the adjustment means may be able to adjust the relative positions of the right-eye image and the left-eye image in the horizontal direction within a first range, and in the vertical direction within a second range smaller than the first range.

According to the above configuration, the user can adjust the position of the right-eye image and/or the position of the left-eye image in the horizontal direction and also in the vertical direction in a narrower range as compared to the horizontal direction.

Further, in another embodiment of the present invention, designated coordinate detection means for detecting a designated coordinate corresponding to a display position on the second display means may be connected to the display control apparatus. In this case, the display control program may further cause the computer to function as first adjustment bar control means. The first adjustment bar control means displays a first adjustment bar on the second display means, and adjusts a slider of the first adjustment bar, according to the designated coordinate detected by the designated coordinate detection means. The adjustment means adjusts at least one of the relative positions, relative sizes and relative rotations of the right-eye image and the left-eye image, according to a position of the slider, of the first adjustment bar, which is adjusted by the first adjustment bar control means, and stores in storage means an adjustment amount for each stereoscopic image.

According to the above configuration, the amount of adjustment of the relative positions, relative sizes and relative rotations of the right-eye image and the left-eye image which are adjusted by the first adjustment bar can be stored in the storage means. This allows, for example, the adjusted image to be read and displayed by another apparatus, thereby displaying the adjusted stereoscopic image on the another apparatus.

Further, in another embodiment of the present invention, the display control apparatus may include a stereo camera.

According to the above configuration, the stereoscopic image may be adjusted by using the right-eye image and the left-eye image which are taken by the stereo camera included in the display control apparatus.

Further, in another embodiment of the present invention, the display control apparatus is a handheld display apparatus configured in one piece of the first display means and the second display means, and the first display means and the second display means are joined together so as to be foldable.

According to the above configuration, the foldable handheld display apparatus capable of displaying a stereoscopic image and a planar image can be provided.

Further, in another embodiment of the present invention, the display control apparatus may be detachably connected to storage means for storing therein the right-eye image and the left-eye image.

According to the above configuration, for example, the right-eye image and the left-eye image which are taken by another apparatus can be stored in the storage means and loaded into the display control apparatus.

Further, in another embodiment of the present invention, the display control apparatus may include communication means capable of transmission and reception of the right-eye image and the left-eye image.

According to the above configuration, for example, the right-eye image and the left-eye image which are taken by another apparatus can be loaded into the display control apparatus by using the communication means.

Further, in another embodiment of the present invention, the display control apparatus may include a slider configured to be adjustable a position thereof in a predetermined direction. The display control program further causes the computer to function as mode selection means. The mode selection means selects either of a first mode in which the right-eye image and the left-eye image, which are already taken, are used and a second mode in which the right-eye image and the left-eye image taken of a virtual space by means of two virtual cameras, are used. In the case where the first mode is selected by the mode selection means, the first display control means displays the stereoscopic image by using the right-eye image and the left-eye image which are already taken. Also, in the case where the second mode is selected by the mode selection means, the first display control means adjusts a distance between the virtual cameras, according to a position of the slider, and displays the stereoscopic image by using the right-eye image and the left-eye image taken of the virtual space by means of the two virtual cameras adjusted the distance therebetween.

According to the above configuration, the user can cause the display control apparatus to operate in the first mode and the second mode, and these modes are selectable. In the first mode, the stereoscopic image can be displayed by using the images which are already taken. In the second mode, a distance between virtual cameras, which are the components of the virtual stereo camera and which are present in the virtual space, can be adjusted by using the slider. This allows the user to adjust the parallax of the virtual cameras which are the components of the virtual stereo camera, thereby adjusting the appearance of the stereoscopic image.

Further, in another embodiment of the present invention, the first display control means may display the stereoscopic image only in the case where the first mode is selected by the mode selection means and when the slider is positioned at a predetermined position.

According to the above configuration, when the first mode is selected, the user can control displaying/not displaying of the stereoscopic image on the first display means, according to the position of the slider.

Further, another embodiment of the present invention is a display control program executed by a computer of a display control apparatus including a slider configured to be adjustable a position thereof in a predetermined direction. The display control program causes the computer to function as virtual camera setting means and display control means. The virtual camera setting means sets a distance between two virtual cameras present in a virtual space, according to the position of the slider. The display control means displays a stereoscopic image on display means configured to display a stereoscopically visible image, by using a right-eye image and a left-eye image taken, in real time, of the virtual space at the distance between the virtual cameras which is set by the virtual camera setting means.

According to the above configuration, the position of the slider included in the display control apparatus is adjusted, and thereby the distance between the two virtual cameras present in the virtual space is set. Then, the image of the virtual space is taken at the set distance between the virtual cameras, and the stereoscopic image is displayed on the display means configured to display the stereoscopically visible image. This allows the user, for example, to adjust the appearance of the stereoscopic image taken of the three-dimensional game space.

Further, in another embodiment of the present invention, the present invention may be implemented in an embodiment of the display control apparatus which executes the above-described display control program. Alternatively, a plurality of devices, which realize the above means, may interact with one another, thereby being configured as one display control system.

According to the present invention, the user can adjust the right-eye image and the left-eye image which are displayed on the second display means, while seeing the stereoscopic image displayed on the first display means. This allows the user to easily adjust the stereoscopic effect of the stereoscopic image.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
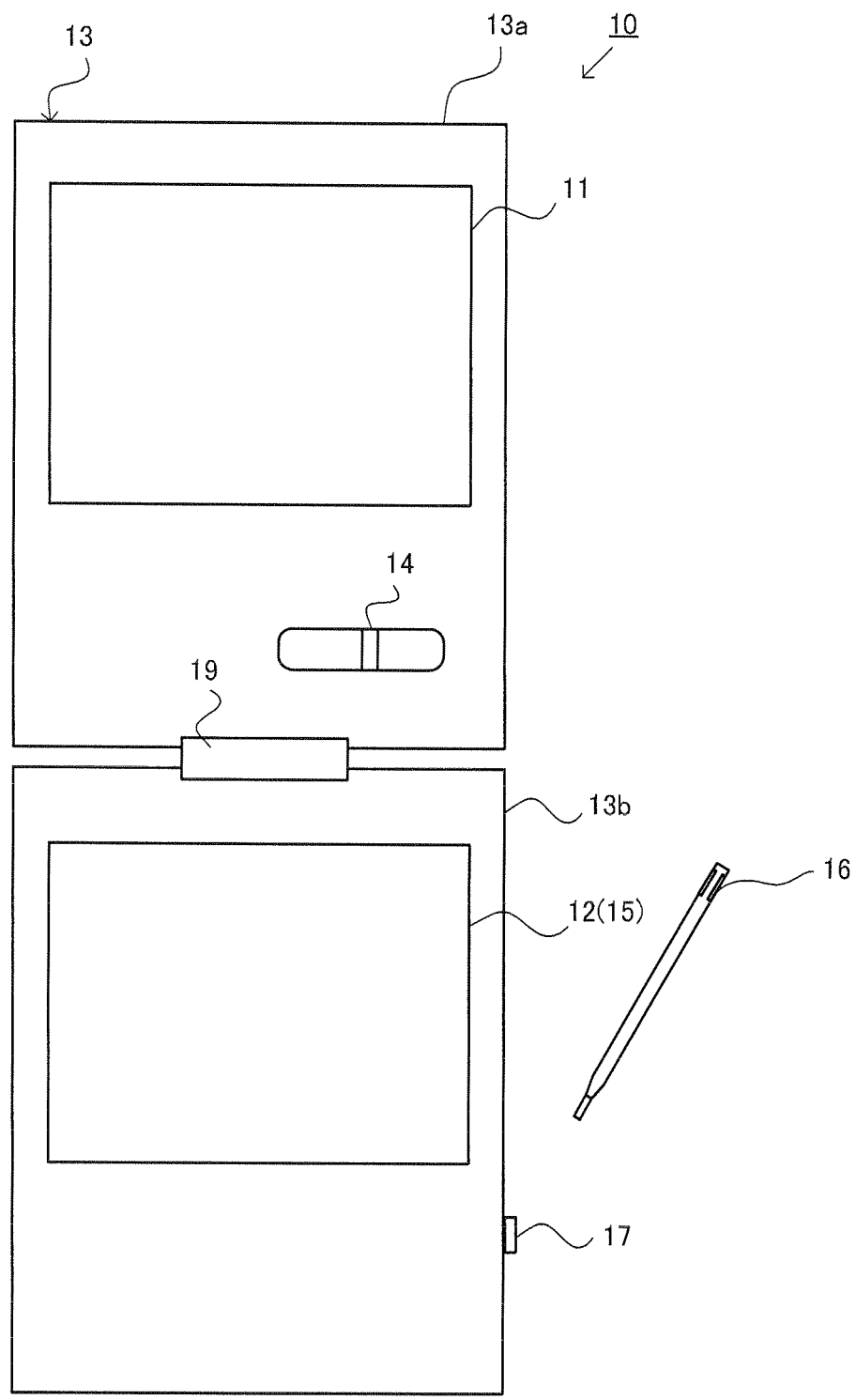
FIG. 1 is an external view of a handheld image display apparatus according to an embodiment of the present invention.

An image display apparatus according to a first embodiment of the present invention will be described, with reference to the accompanying drawings. FIG. 1 is an external view of a handheld image display apparatus according to the embodiment of the present invention.

(Description of Image Display Apparatus)

In FIG. 1, an image display apparatus 10 includes the stereoscopic image display device 11 capable of displaying a stereoscopic image, and a planar image display device 12 capable of displaying a two-dimensional planner image. A housing 13 is configured of an upper housing 13a and a lower housing 13b. The stereoscopic image display device 11 is accommodated in the upper housing 13a, and the planar image display device 12 is accommodated in the lower housing 13b. The stereoscopic image display device 11 and the planar image display device 12 each have a predetermined resolution (256 dots×192 dots, for example). Although a liquid crystal display is used as a display device in the present embodiment, any other display device, such as a display device using an EL (Electro Luminescence), or the like may be used. In addition, a display device having any resolution may be used.

The stereoscopic image display device 11 is a display device capable of displaying an image which is stereoscopically visible by the naked eye, and a lenticular lens type display device or a parallax barrier type display device is used. In the present embodiment, the stereoscopic image display device 11 of a parallax barrier type is used.

A touch panel 15, which is a designated coordinate detection device, is mounted on the screen of the planar image display device 12. The touch panel 15 may be of any type such as a resistive film type, an optical type (infrared type), or a capacitive coupling type. In the present embodiment, the touch panel 15 is of the resistive film type. The touch panel 15 detects a position on the screen of the planar image display device 12 in response to the user touching the screen of the planar image display device 12 by using a stick 16. The position detected by the touch panel 15 corresponds to the position on the screen of the planar image display device 12. The user can designate the position on the screen not only by the stick 16 but also by a finger. In the present embodiment, the touch panel 15 has the same resolution (detection accuracy) as that of the planar image display device 12. However, the resolution of the touch panel 15 may not necessarily be the same as the resolution of the planar image display device 12.

A hardware slider 14 described below is provided on the upper housing 13a. A shutter button 17 is provided on a side surface of the lower housing 13b for use in taking an object to be imaged by a stereo camera 18 described below. The upper housing 13a and the lower housing 13b are connected via a hinge portion 19. The upper housing 13a and the lower housing 13b are connected to each other via the hinge portion 19 so as to be openable and closable (foldable).

Figure 2:
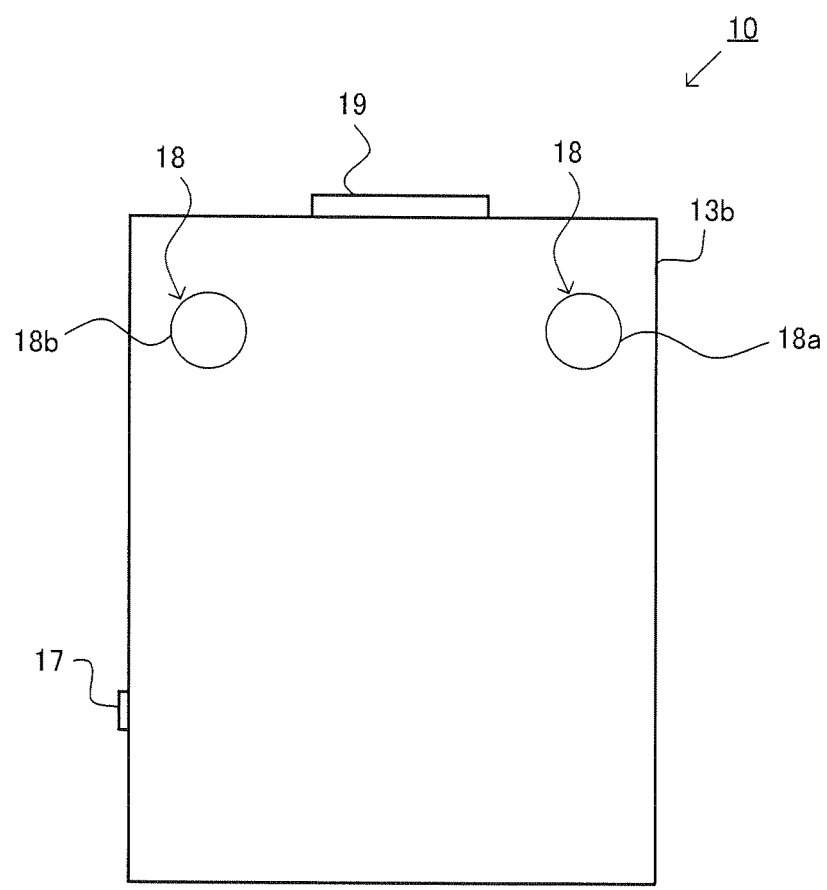
FIG. 2 is a diagram illustrating a lower housing 13b viewed from a rear side thereof in a state in which an upper housing 13a and the lower housing 13b are folded.

FIG. 2 is a diagram illustrating the lower housing 13b viewed from a rear side thereof in a state in which the upper housing 13a and the lower housing 13b are folded. As shown in FIG. 2, a stereo camera 18 is provided in the rear side of the lower housing 13b. The stereo camera 18 includes a left-eye image imaging section 18a and a right-eye image imaging section 18b. The distance between the left-eye image imaging section 18a and the right-eye image imaging section 18b is set, for example, to an average distance (65 mm, for example) between the left and right human eyes. Each of the left-eye image imaging section 18a and the right-eye image imaging section 18b includes an imaging device, such as a CCD image sensor or a CMOS image sensor, having a predetermined resolution, and a zoom lens. The left-eye image imaging section 18a takes the left-eye image, and the right-eye image imaging section 18b takes the right-eye image. The left-eye image imaging section 18a and the right-eye image imaging section 18b take the left-eye image and the right-eye image, respectively, in response to pressing the shutter button 17 by the user. The user can press the shutter button 17, while viewing the screens of the stereoscopic image display device 11 and the planar image display device 12 in a state in which the upper housing 13a and the lower housing 13b are in an open state as shown in FIG. 1. That is, the left-eye image and the right-eye image, when the image of the object to be imaged is taken by the stereo camera 18, are displayed on the screen of the planar image display device 12, and the then stereoscopic image is displayed on the stereoscopic image display device 11. This allows the user to take the image of the object to be imaged, while verifying the image displayed on the screen.

Figure 3:
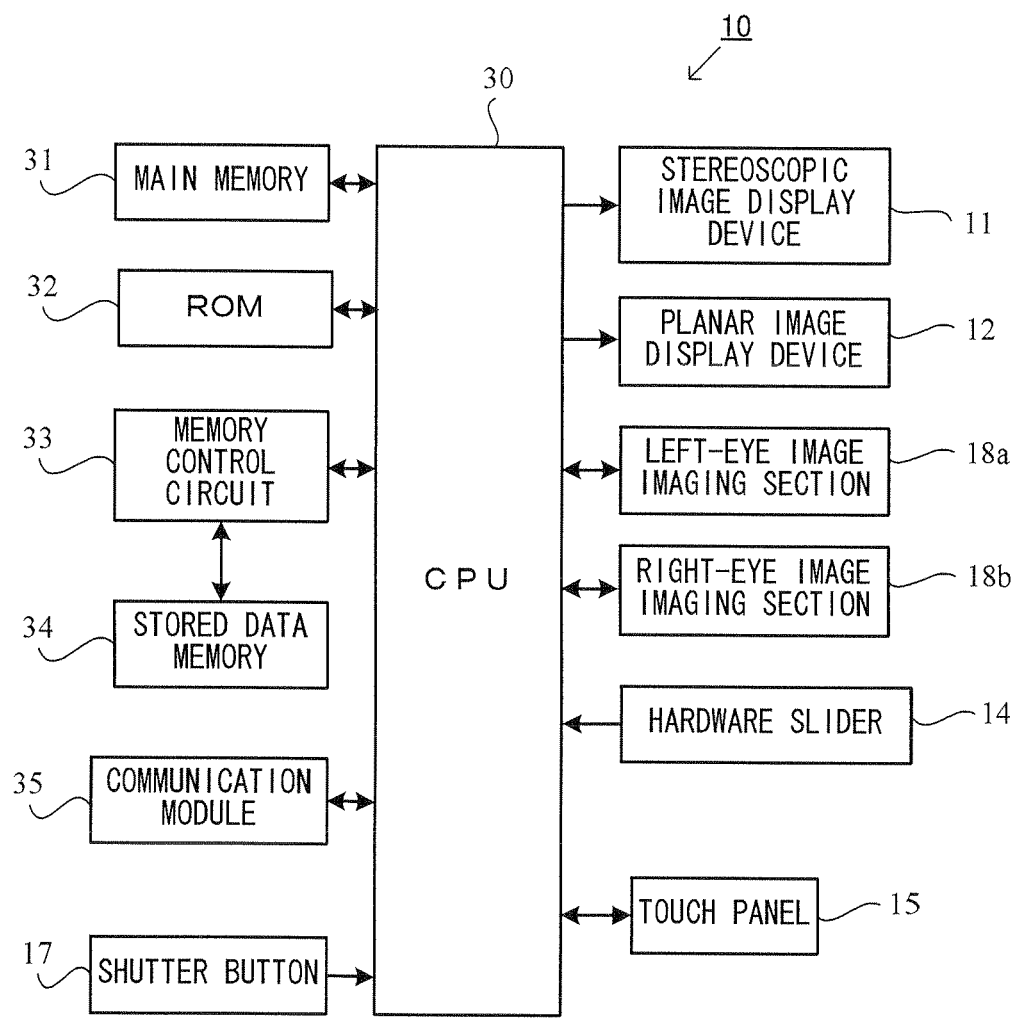
FIG. 3 is a block diagram illustrating an internal configuration of the image display apparatus 10.

FIG. 3 is a block diagram illustrating an internal configuration of the image display apparatus 10. As shown in FIG. 3, other components included in the image display apparatus 10 are a CPU 30, a main memory 31, a ROM 32, a memory control circuit 33, a stored data memory 34, and a communication module 35. These electronic components are mounted on an electronic circuit substrate and accommodated in the lower housing 13b (or the upper housing 13a).

The CPU 30 is information processing means for executing a predetermined program. In the present embodiment, the predetermined program is stored in the ROM 32 of the image display apparatus 10, and a display control process described below is executed by the CPU 30 executing the predetermined program.

The main memory 31, the ROM 32, and the memory control circuit 33 are connected to the CPU 30. The stored data memory 34 is connected to the memory control circuit 33. The main memory 31 is a readable/writable semiconductor memory. The main memory 31 includes an area for temporarily storing the predetermined program, areas for temporarily storing the left-eye image and the right-eye image, and a work area and a buffer area of the CPU 30. That is, the main memory 31 stores various types of data used for the display control process described below, stores the predetermined program stored in the ROM 32, and the like. The ROM 32 is a non-volatile memory and used for storing the predetermined program. The stored data memory 34 is storage means for storing data of the images taken by the left-eye image imaging section 18a and the right-eye image imaging section 18b, and the like. The stored data memory 34 is implemented as a non-volatile storage medium and, for example, a NAND flash memory is used. The memory control circuit 33 is a circuit for controlling reading of data from the stored data memory 34 or writing of data to the stored data memory 34 in accordance with an instruction from the CPU 30.

The program executed by the CPU 30 may be stored in advance in the ROM 32, may be obtained from the stored data memory 34, or may be obtained from another apparatus by means of communication with the another apparatus via the communication module 35.

The communication module 35 has a function of performing wired or wireless communication with the another apparatus. The communication module 35 has a function of performing, for example, infrared communication with the another apparatus. The communication module 35 may have a function of connecting to a wireless LAN in a method based on, for example, IEEE 802.11.b/g standard, or have a function of performing communication with the another apparatus by means of the Bluetooth (registered trademark) technology. Furthermore, the communication module 35 may also have a function of connecting to a mobile communication network by means of a communication scheme used for mobile phones, and the like.

The touch panel 15 is connected to the CPU 30. The touch panel 15 is connected to an interface circuit (not shown), and the interface circuit generates a predetermined form of touch position data, based on a signal outputted from the touch panel 15, and outputs the touch position data to the CPU 30. For example, the touch position data represents a coordinate of a position, on which an input is made, on an input surface of the touch panel 15. The interface circuit reads a signal outputted from the touch panel 15, and generates the touch position data every predetermined time. The CPU 30 acquires the touch position data via the interface circuit to recognize the position on which the input is made on the touch panel.

The shutter button 17 and the imaging devices (the left-eye image imaging section 18a and the right-eye image imaging section 18b) are connected to the CPU 30. In response to pressing the shutter button 17, the CPU 30 transmits an instruction for taking images to the left-eye image imaging section 18a and the right-eye image imaging section 18b. The left-eye image imaging section 18a and the right-eye image imaging section 18b take images, according to the instruction from the CPU 30, and output data of the respective taken images to the CPU 30.

The stereoscopic image display device 11 and the planar image display device 12 are connected to the CPU 30. The stereoscopic image display device 11 and the planar image display device 12 display images, according to respective instructions from the CPU 30. As described above, the stereoscopic image is displayed on the stereoscopic image display device 11, and the planar image is displayed on the planar image display device 12.

The hardware slider 14 is connected to the CPU 30. The hardware slider 14 is a slide switch and adjustable at any position (or a predetermined position) in a horizontal direction. The hardware slider 14 outputs to the CPU 30 a signal according to the adjusted position.

Figure 4:
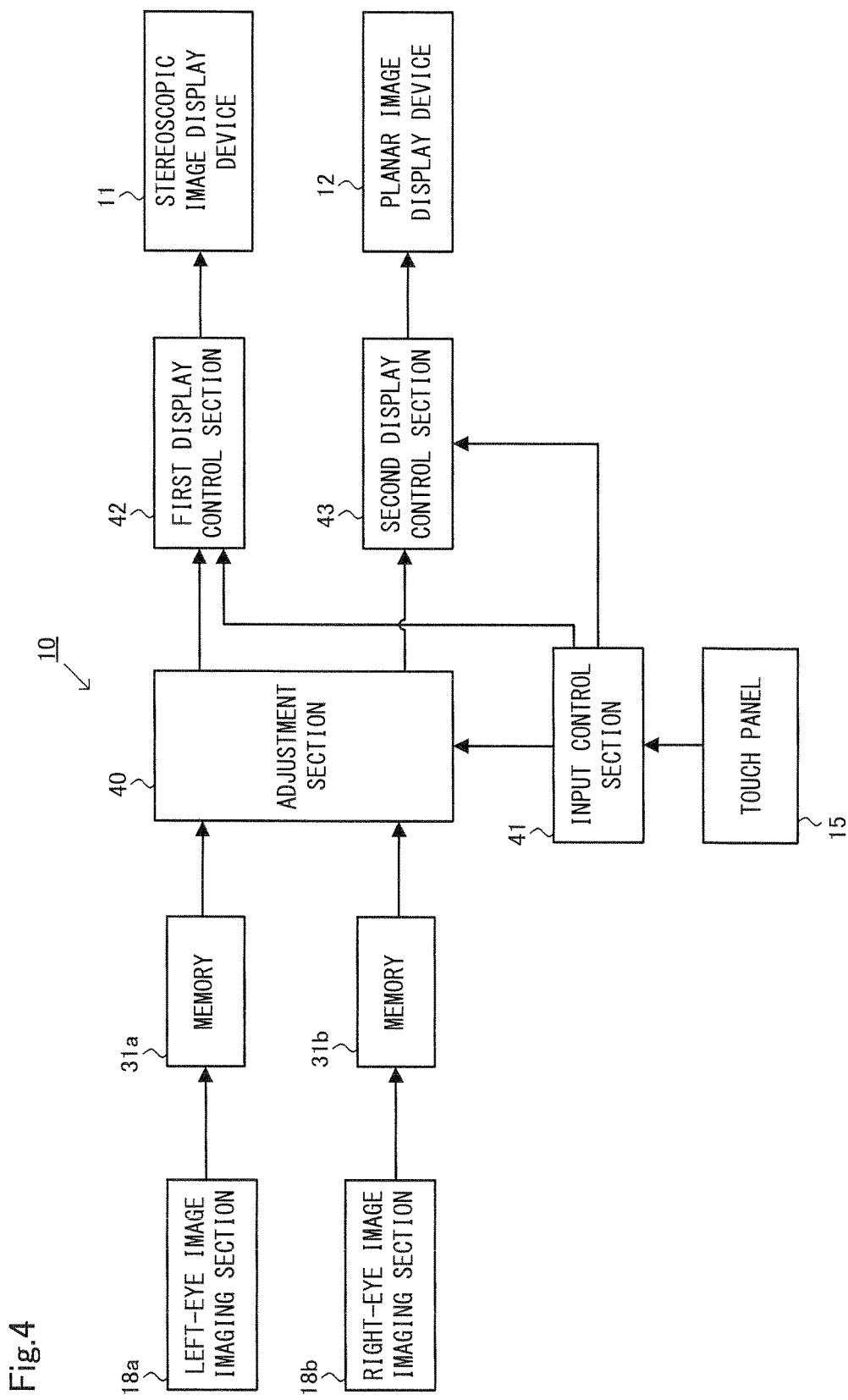
FIG. 4 is a block diagram illustrating a functional structure of the image display apparatus 10.

Next, a functional structure of the image display apparatus 10 will be described, with reference to FIG. 4. FIG. 4 is a block diagram illustrating the functional structure of the image display apparatus 10. As shown in FIG. 4, the image display apparatus 10 includes memories 31a and 31b, an adjustment section 40, an input control section 41, a first display control section 42, and a first display control section 43. The memories 31a and 31b are parts of the storage area of the main memory 31. The adjustment section 40, the input control section 41, the first display control section 42, and the second display control section 43 are achieved by the CPU 30 executing the predetermined program.

The memories 31a and 31b temporarily store the images taken by the left-eye image imaging section 18a and the right-eye image imaging section 18b, respectively. The left-eye image taken by the left-eye image imaging section 18a is stored in the memory 31a, and the left-eye image taken by the right-eye image imaging section 18b is stored in memory 31b.

According to the signal outputted from the input control section 41, the adjustment section 40 adjusts the relative positions, relative sizes, and relative rotations of the left-eye image and the right-eye image when displayed on the display device. The position of each of the left-eye image and the right-eye image is represented as a coordinate value (which is internally set in XY coordinate system) of the center of the each image. An X-axis direction in the XY coordinate system corresponds to the horizontal direction of the screens (of the stereoscopic image display device 11 and the planar image display device 12), and a Y-axis direction corresponds to the vertical direction of the screens. The relative positions of the left-eye image and the right-eye image are adjusted by changing the coordinate value of the center of each image in the horizontal direction (X direction) and/or the vertical direction (Y direction). For example, the adjustment section 40 adjusts the relative positions of the left-eye image and the right-eye image by moving the left-eye image and/or the right-eye image in the horizontal direction. Furthermore, the adjustment section 40 adjusts the relative sizes of the left-eye image and the right-eye image by changing the size of the left-eye image and/or the right-eye image. For example, the adjustment section 40 enlarges the left-eye image, thereby making the size of the left-eye image large relative to the right-eye image. Furthermore, the adjustment section 40 rotates the left-eye image and/or the right-eye image about the center of the image, thereby adjusting the relative rotations (angles of rotations) of the left-eye image and the right-eye image. For example, the adjustment section 40 rotates the left-eye image by a predetermined angle, thereby adjusting the relative rotations of the left-eye image and the right-eye image.

The input control section 41 outputs to the adjustment section 40 a control signal, according to the position detected by the touch panel 15. That is, according to the position detected by the touch panel 15, the input control section 41 detects operations on the left-eye image and the right-eye image (such as an operation on the position adjustment bar 54 described below (see FIG. 5), a rotation operation or an enlargement or reduction operation on the left-eye image or the right-eye image), which are performed by the user, and outputs the detected data to the adjustment section 40 as the control signal. Furthermore, according to the position detected by the touch panel 15, the input control section 41 adjusts the position of the position adjustment bar 54 displayed on the planar image display device 12, a position of the slider 55 of the position adjustment bar 54, and a position of the slider 57 of the zoom adjustment bar 56. In addition, the input control section 41 scrolls or zooms the stereoscopic image displayed on the stereoscopic image display device 11, according to the position detected by the touch panel 15 (the detail will be described below).

The first display control section 42 performs a display control for the stereoscopic image display device 11. The first display control section 42 displays the stereoscopic image on the stereoscopic image display device 11 by synthesizing the left-eye image and the right-eye image adjusted by the adjustment section 40. For example, if the respective positions of the left-eye image and the right-eye image are shifted by the adjustment section 40 in the left-right direction by a predetermined amount, the first display control section 42 shifts the respective positions of the left-eye image and the right-eye image in the left-right direction by the predetermined amount. The first display control section 42 then synthesizes the shifted two images to generate the stereoscopic image. For example, the first display control section 42 divides each of the two shifted images into rectangle-shaped images each having one line of pixels aligned in the vertical direction, and alternately aligns the rectangle-shaped images of each image, thereby synthesizing the two images. The first display control section 42 then outputs data of the synthesized image to the stereoscopic image display device 11. When viewed through the parallax barrier in the stereoscopic image display device 11, the image is displayed such that presentation viewed only with the right eye and presentation only viewed with the left eye are alternately displayed line by line. Therefore, the right-eye image is viewed with the right eye and the left-eye image is viewed with the user's left eye. This allows the stereoscopic image to be displayed on the stereoscopic image display device 11. Furthermore, the first display control section 42 zooms or scrolls the stereoscopic image displayed on the stereoscopic image display device 11, according to the signal outputted from the input control section 41.

The second display control section 43 performs the display control for the planar image display device 12. The second display control section 43 superimposes the left-eye image and the right-eye image one on the other, which are adjusted by the adjustment section 40, and displays a planar image, which is obtained by the superimposition, on the planar image display device 12. For example, if the respective positions of the left-eye image and the right-eye image are shifted by the adjustment section 40 in the left-right direction by the predetermined amount, the second display control section 43 shifts the respective positions of the left-eye image and the right-eye image in the left-right direction by the predetermined amount. The second display control section 43 then makes the shifted two images semi-transparent and superimposes one on the other, and displays a resulting superimposed image on the planar image display device 12 in a planar manner. Therefore, the user can view both the left-eye image and the right-eye image, and easily recognize an extent of how much the left-eye image and the right-eye image are shifted. Also, the second display control section 43 controls the display of each of the position adjustment bar 54 and the zoom adjustment bar 56, based on the signal outputted from the input control section 41.

(Adjustment Operation on Stereoscopic Image)

Figure 5:
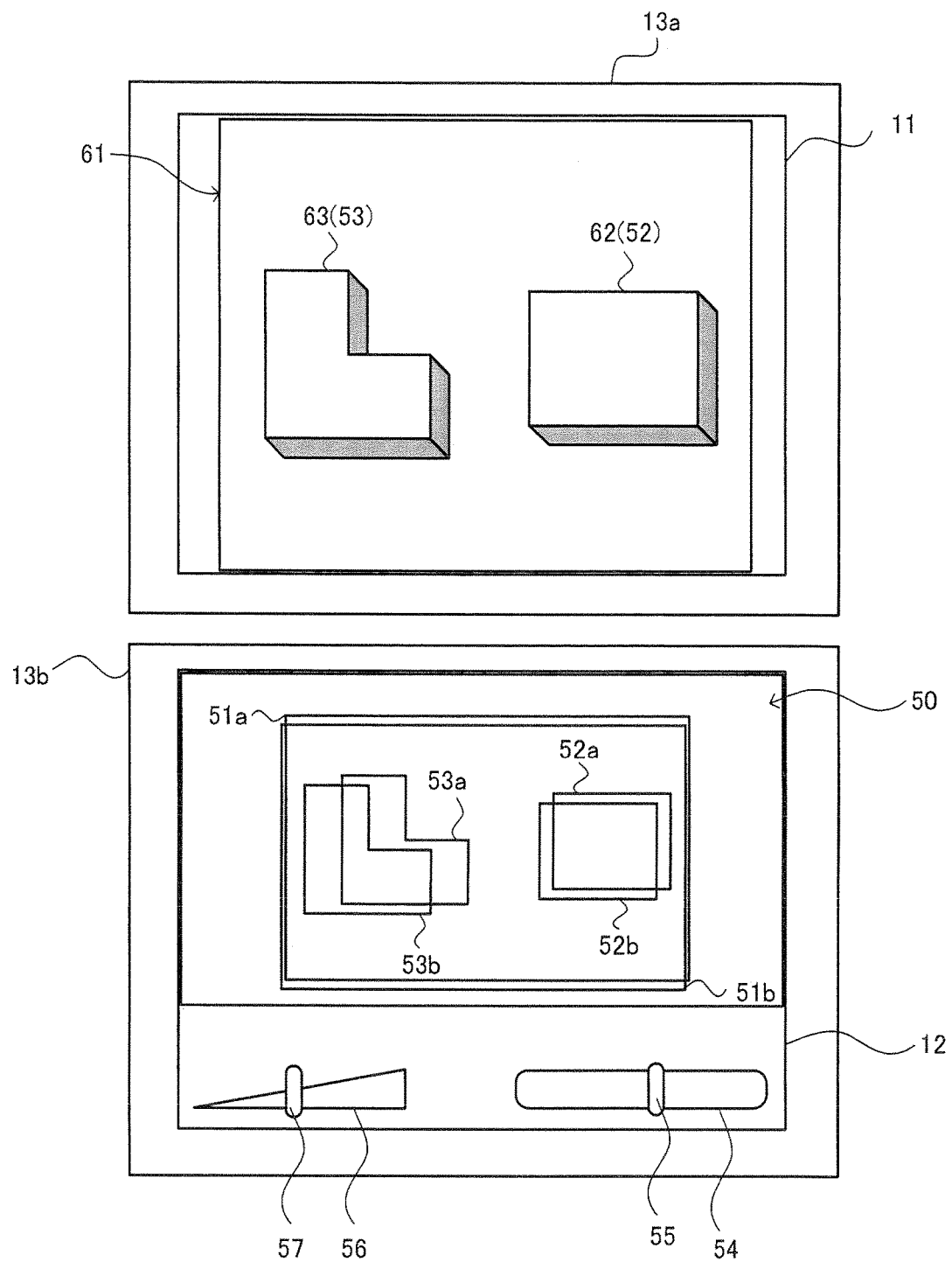
FIG. 5 is a diagram illustrating an example of images displayed on respective screens of a stereoscopic image display device 11 and a planar image display device 12.

Next, the adjustment of the stereoscopic image will be described, with reference to FIG. 5 to FIG. 12. FIG. 5 is a diagram illustrating an example of images displayed on the screens of the stereoscopic image display device 11 and the planar image display device 12. In FIG. 5 to FIG. 12, components irrelevant to the present invention is omitted and additionally, the screens of the stereoscopic image display device 11 and the planar image display device 12 are represented relatively large in size as compared to the actual sizes.

As shown in FIG. 5, the image display region 50 is provided in the screen of the planar image display device 12. A left-eye image 51a and a right-eye image 51b are displayed in the image display region 50. As shown in FIG. 5, a ratio of the width of the image display region 50 in an aspect ratio (a ratio of the length in the horizontal direction (width) to the length in the vertical direction (height)) is greater than a ratio of the width of the left-eye image 51a to the right-eye image 51b in the aspect ratio. That is, the image display region 50 is an area horizontally longer than the width of each of the left-eye image 51a and the right-eye image 51b.

The left-eye image 51a is an image taken by the left-eye image imaging section 18a. An object image 52a and an object image 53a are included in the left-eye image 51a. The object image 52a and the object image 53a are images obtained by the left-eye image imaging section 18a taking images of the objects to be imaged 52 and 53 which exist in actual space. Also, the right-eye image 51b is an image taken by the right-eye image imaging section 18b, and the object image 52b and the object image 53b are included in the right-eye image 51b. The object image 52b and the object image 53b are images obtained by taking the images of the objects to be imaged 52 and 53, which exist in actual space, by the right-eye image imaging section 18b. That is, the object image 52a and the object image 52b are images taken of the same the object to be imaged 52. However, the left-eye image 51a and the right-eye image 51b have parallax therebetween, and therefore the object image 52a and the object image 52b are not exactly the same images as each other. Similarly, although the object image 53a and the object image 53b are images taken of the same object to be imaged 53, the left-eye image 51a and the right-eye image 51b has parallax, and therefore the object image 53a and the object image 53b are not exactly the same images as each other.

As shown in FIG. 5, the left-eye image 51a and the right-eye image 51b displayed on the screen the planar image display device 12 are made semi-transparent and superimposed one on the other for display. The position adjustment bar 54 and the slider 55 are displayed on the screen of the planar image display device 12. The zoom adjustment bar 56 and the slider 57 are also displayed on the screen of the planar image display device 12.

On the other hand, the stereoscopic image 61 is displayed on the screen of the stereoscopic image display device 11. The stereoscopic image 61 is the image obtained by synthesizing the left-eye image 51a and the right-eye image 51b. The stereoscopic image 61 is stereoscopically visible when seen by the user. The object image 62 and the object image 63 are included in the stereoscopic image 61. The object image 62 is an image taken of the object to be imaged 52, which exists in actual space, and an image stereoscopically visible to the user, as shown in FIG. 5. The object image 62 is an image obtained by synthesizing the object image 52a of the left-eye image 51a with the object image 52b of the right-eye image 51b. Similarly, the object image 63 is an image taken of the object to be imaged 53, which exists in actual space, and an image stereoscopically visible to the user, as shown in FIG. 5. The object image 63 is an image obtained by synthesizing the object image 53a of the left-eye image 51a with the object image 53b of the right-eye image 51b.

The position adjustment bar 54 is a user interface for the user to adjust the respective positions of the left-eye image 51a and the right-eye image 51b in the horizontal direction and the vertical direction of the screen. The user slides the slider 55 of the position adjustment bar 54 in the horizontal direction, while touching the slider 55 by using the stick 16, thereby adjusting an amount of shift (the relative positions) of the left-eye image 51a and the right-eye image 51b in the horizontal direction. Also, the user touches the predetermined position of the position adjustment bar 54 by using the stick 16 to move the slider 55 to the touch position, thereby adjusting the amount of shift (the relative positions) of the left-eye image 51a and the right-eye image 51b in the horizontal direction. This adjustment changes the stereoscopic effect of the stereoscopic image displayed on the stereoscopic image display device 11 and the detail thereof will be described below.

In FIG. 5, the left-eye image 51a and the right-eye image 51b are displayed being shifted in the up-down and the left-right directions for the purpose of explanation and, in fact, the respective positions of the left-eye image 51a and the right-eye image 51b coincide with each other (the center of the left-eye image 51a coincides with the center of the left-eye image 51a). However, the position of the object image 52a included in the left-eye image 51a differs from the position of the object image 52b included in the right-eye image 51b. Specifically, when the two images are made semi-transparent and superimposed one on the other, the object image 52a included in the left-eye image 51a is shifted rightward, as compared to the object image 52b included in the right-eye image 51b. That is, the object image 52a included in the left-eye image 51a is positioned relatively rightward, and the object image 52b included in the right-eye image 51b is positioned relatively leftward. Therefore, the object image 62 displayed on the stereoscopic image display device 11 appears to be positioned closer to the user than the screen of the stereoscopic image display device 11 (see FIG. 7 described below) is. The object image 53a included in the left-eye image 51a is further shifted rightward, as compared to the object image 53b included in the right-eye image 51b. That is, the object image 53a included in the left-eye image 51a is shifted rightward, and the object image 53b included in the right-eye image 51b is shifted leftward. The amount of shift of the object image 53a and the object image 53b is larger than the amount of shift of the object image 52a and the object image 52b. Therefore, the object image 63 displayed on the stereoscopic image display device 11 appears to be positioned even closer to the user than the object image 62 (see FIG. 7 described below) is.

Figure 6:
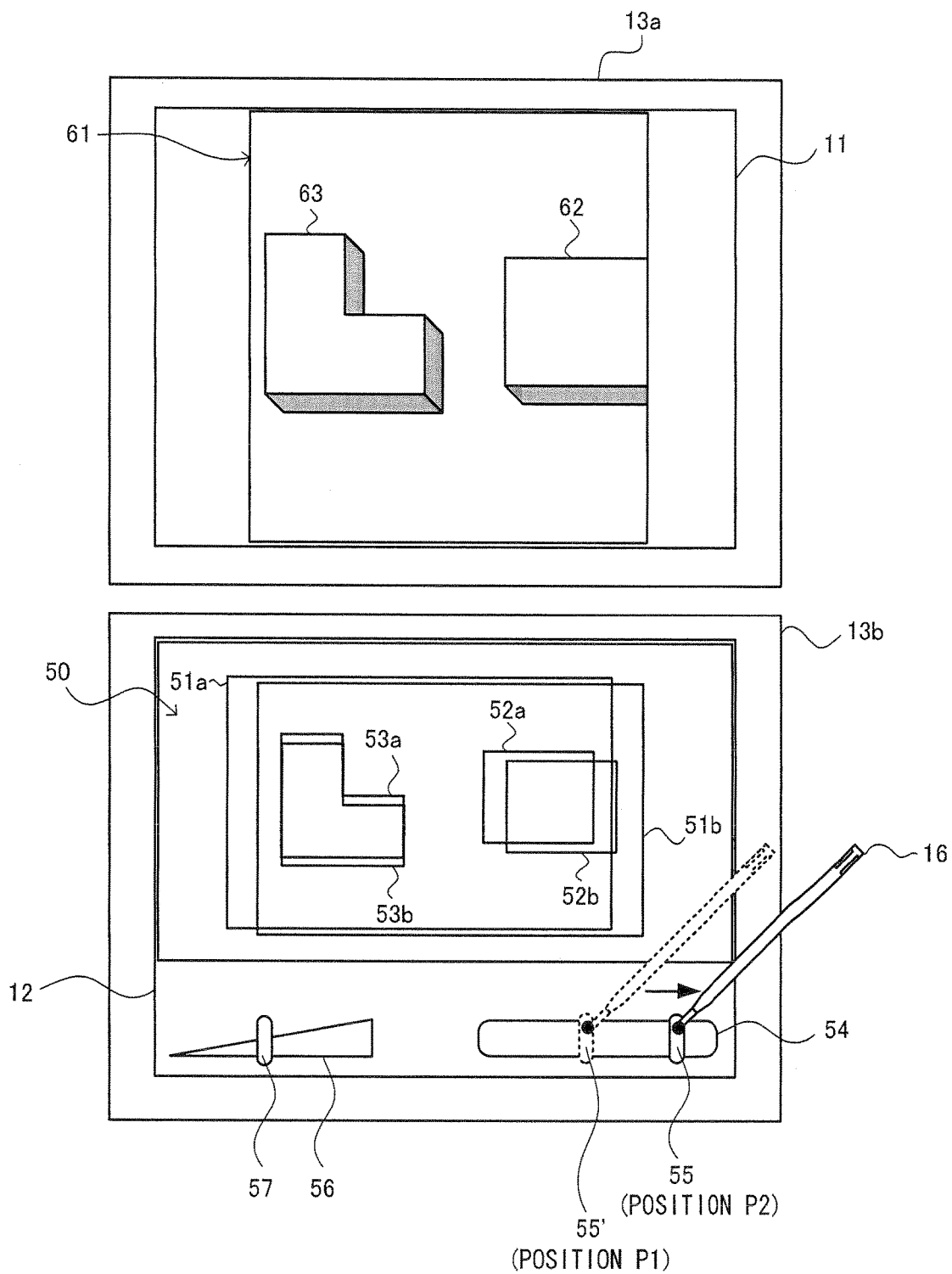
FIG. 6 is a diagram illustrating a state in which a user adjusts a slider 55 of a position adjustment bar 54 by using a stick 16.

Next, the adjustment of the left-eye image 51a and the right-eye image 51b in the horizontal direction will be described, with reference to FIG. 6. FIG. 6 is a diagram illustrating a state in which the user adjusts the slider 55 of the position adjustment bar by using the stick 16. In FIG. 6, a slider 55', which is indicated by a dotted line, is the slider 55 prior to adjustment (being moved in the right direction of the screen) by the user, and the slider 55, which is indicated by a solid line, is after the adjustment by the user. In accordance with the slider 55 being moved from a position P1 to a position P2, the left-eye image 51a and the right-eye image 51b displayed in the image display region 50 of the planar image display device 12 each move in the horizontal direction of the screen. Specifically, the left-eye image 51a moves in the leftward direction of the screen, and the right-eye image 51b moves in the rightward direction of the screen. That is, when the slider 55 of the position adjustment bar 54 moves in the horizontal direction, the left-eye image 51a and the right-eye image 51b move away from each other (shift) in the horizontal direction by an amount according to an amount of movement of the slider 55, and therefore the amount of shift of the left-eye image 51a and the right-eye image 51b changes. The amount of shift of the left-eye image 51a and the right-eye image 51b may be changed by either of the left-eye image 51a and the right-eye image 51b moving according to the amount of movement of the slider 55.

When the slider 55 of the position adjustment bar 54 is positioned at a predetermined position (the center of a range of movement, for example), the amount of shift of the left-eye image 51a and the right-eye image 51b becomes zero (the position at the center of the left-eye image 51a coincides with the position at the center of the right-eye image 51b). For example, in accordance with the slider 55 being slid rightward from the center, the amount of shift between the images becomes large such that the left-eye image 51a moves leftward and the right-eye image 51b moves rightward. This allows the object image 62 and the object image 63 displayed on the stereoscopic image display device 11 to appear to moving in the depth direction of the screen, as described below. On contrary, in accordance with the slider 55 being slid leftward from the center, an absolute value of the amount of shift between the images becomes large such that the left-eye image 51a moves rightward and the right-eye image 51b moves leftward (a value of the amount of shift in this case becomes negative). This allows the object image 62 and the object image 63 displayed on the stereoscopic image display device 11 to appear to moving in the frontward direction of the screen, as described below.

On the other hand, the stereoscopic image 61 displayed on the screen of the stereoscopic image display device 11 also changes according to the movement of the slider 55. When the slider 55 moves, the respective positions in the horizontal direction of the left-eye image 51a viewed with the user's left eye and the right-eye image 51b viewed with the user's right eye, which are displayed on the screen of the stereoscopic image display device 11, also change. That is, in similar to the left-eye image 51a and the right-eye image 51b displayed on the planar image display device 12, the left-eye image 51a and the right-eye image 51b displayed on the stereoscopic image display device 11 also move in the horizontal direction by the amount according to the amount of movement of the slider 55. As a result, when the user views the stereoscopic image 61 after the slider 55 has moved (the position P2), the object image 62 and the object image 63 included in the stereoscopic image 61 appear to be positioned in the depth direction of the screen, as compared to before the slider 55 moves (the position P1). That is, the movement of the slider 55 causes the object image 62 and the object image 63 included in the stereoscopic image 61 to appear to have moved in the depth direction of the screen.

Figure 7:
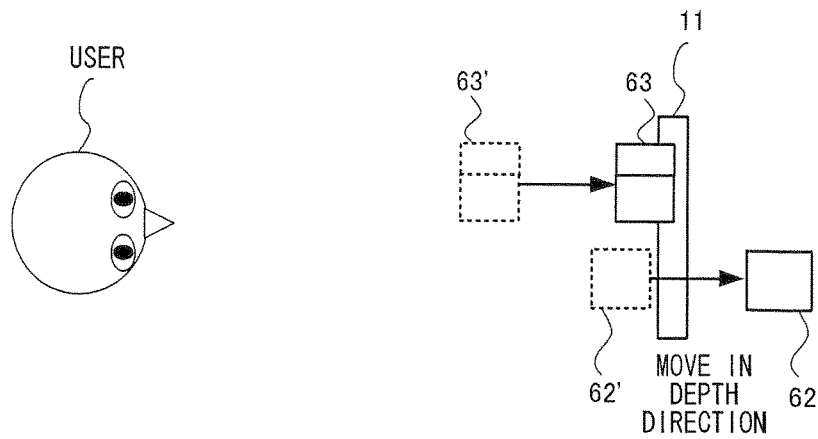
FIG. 7 is a diagram illustrating a state in which respective positions of an object image 62 (52) and an object image 63 (53), of which the user feels an experience, are changed depending on the adjustment of the slider 55 of a position adjustment bar 54.

FIG. 7 is a diagram illustrating a state in which the respective positions of the object image 62 (52) and the object image 63 (53), of which the user feels an experience, are changed depending on the adjustment of the slider 55 of the position adjustment bar 54. FIG. 7 is the diagram illustrating the user, the stereoscopic image display device 11, and the objects to be imaged 52 and 53 (the object image 62 and 63) viewed from the above, and illustrates the positional relationship thereof felt by the user as an experience. Before the slider 55 moves, the user feels an experience as if the object image 62 and the object image 63 are positioned in front of the screen of the stereoscopic image display device 11 (closer to the user side than the screen is) (appear to be positioned at positions 62' and 63', respectively). More specifically, in similar to the positional relationship between the object to be imaged 52 and the object to be imaged 53, which exist in actual space, the user feels an experience as if the object image 63' exists at a position in the frontward direction of the screen (a position closer to the user), as compared to the object image 62'. On the other hand, in accordance with the movement of the slider 55, it appears to the user as if the object image 62 and the object image 63 move in the depth direction (a direction perpendicular to the screen, and the viewing direction of the user) of the screen of the stereoscopic image display device 11 (in other words, it appears as if the screen of the stereoscopic image display device 11 moves toward the user). More specifically, after the slider 55 has moved, the user feels an experience as if the object image 62 is positioned in the depth direction of the screen, and the object image 63 is positioned near the screen. As described above, when the user moves the slider 55 in the right direction of the screen of the planar image display device 12, it appears as if the object image 62 (and 63) included in the stereoscopic image 61 has moved in the depth direction of the screen of the stereoscopic image display device 11 (as if moves away in the depth direction of the screen). On contrary, when the user moves the slider 55 in the left direction, it appears as if the object image 62 (and 63) included in the stereoscopic image 61 has moved in the frontward direction of the screen (to jump out from the screen). That is, when the user adjusts the slider 55 of the position adjustment bar 54 in the horizontal direction, it appears to the user as if the position of the object to be imaged included in the stereoscopic image 61 has changed. Therefore, the user can change the appearance of the stereoscopic image 61 by moving the slider 55 of the position adjustment bar 54 in the horizontal direction.

Furthermore, by moving the slider 55 of the position adjustment bar 54 in the horizontal direction, the user can display a desired object to be imaged included in the stereoscopic image 61 so as to be easily seen by the user. For example, as shown by the dotted line in FIG. 7, before the slider 55 is moved, the position of the object image 63 which is viewed by the user is frontward to the screen and the position (position 63') spaced a predetermined distance away from the screen. On the other hand, the position of the object image 62 which is viewed by the user is frontward to and near the screen (position 62'). In this case, it is easy for the user to view the object image 62 stereoscopically, but difficult for the user to view the object image 63 stereoscopically. This is because the image is displayed actually on the screen and thus, the user focuses the eyes on the screen to see the image. The object image 62' prior to movement, which is viewed near the screen, is easily viewed stereoscopically, because the position recognized by the user in the direction perpendicular to the screen is near the position on which the eyes are focused. On the other hand, the object image 63' prior to movement is poorly viewed stereoscopically because the position recognized by the user in the direction perpendicular to the screen is different from the position on which the eyes are focused (if the object image 63' prior to movement is seen when the eyes are focused on the screen, the image appears blurred or is unrecognizable stereoscopically). In this case, the user moves the slider 55 in the horizontal direction, and thereby moves the object image 63 in the depth direction of the screen, and moves the object image 63 to near the screen. Therefore, by moving the slider 55 in the horizontal direction, the user can display the desired object to be imaged (the object image 63) included in the stereoscopic image 61 so as to be easily seen by the user.

The stereoscopic image 61 after the adjustment of the amount of shift (the position) thereof in the horizontal direction as shown in FIG. 6 becomes such as the stereoscopic image 61 shown in FIG. 5 in which the both sides of the stereoscopic image 61 prior to adjustment are cut off (see FIG. 6). Therefore, part of the object image 62 shown in FIG. 6 is not displayed. This is because the left-eye image 51a and the right-eye image 51b are shifted in the horizontal direction, and which has caused non-overlapping portion of the two images, respectively. If the stereoscopic image including the portions of the left-eye image 51a and the right-eye image 51b, which are not superimposed (non-overlapping area) one on the other, is displayed on the stereoscopic image display device 11, part of the stereoscopic image becomes an image having the stereoscopic effect, while the other part becomes an image having no stereoscopic effect, and which is a state in which "what should be visible is invisible" or "what should be invisible is visible" for the viewer. Therefore, the image, as a whole, ends up causing a sense of discomfort for the user. Therefore, merely the respective positions of the left-eye image 51a and the right-eye image 51b, which are superimposed (superimposing area) one on the other, are synthesized and displayed on the screen of the stereoscopic image display device 11.

Figure 8:
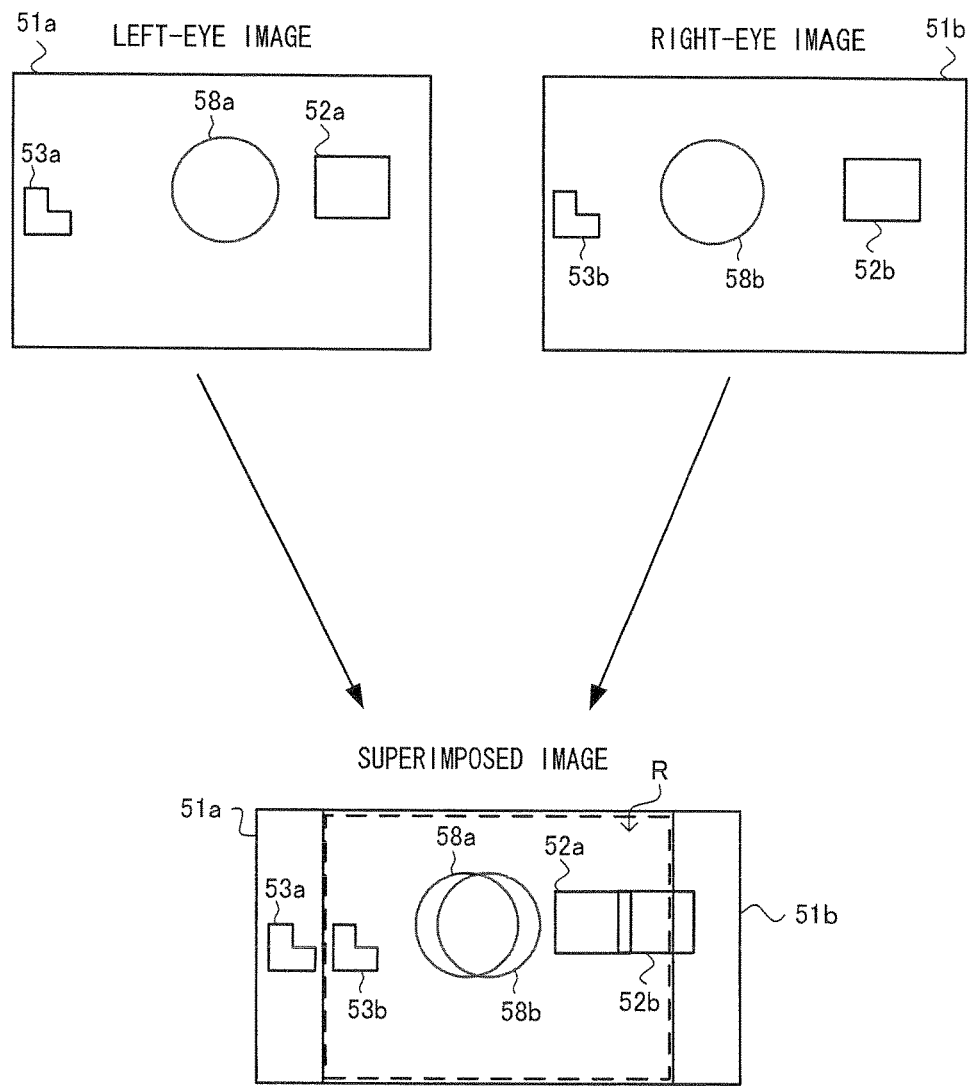
FIG. 8 is a diagram illustrating a superimposed portion and a non-overlapping portion of a left-eye image 51a and a right-eye image 51b being superimposed one on the other.

Here, the "superimposing area" and the "non-overlapping area" of the two images will be described, with reference to FIG. 8. FIG. 8 is a diagram illustrating the superimposed portion and non-overlapping portion of the left-eye image 51a and the right-eye image 51b being superimposed one on the other. As shown in FIG. 8, the object images 52a, 53a, and 58a are included in the left-eye image 51a. Similarly, the object images 52b, 53b, and 58b are included in the right-eye image 51b. Shifting these two images in the horizontal direction and superimposing one on the other cause the superimposed portion and the non-overlapping portion (non-overlapping area) of the two images (superimposing area). The superimposed portion is indicated by an area R of the superimposed image, which is surrounded by the dotted line. The non-overlapping portion is an area other than the area R of the superimposed image. Merely the area R is displayed on the screen of the stereoscopic image display device 11. In this case, when the user sees the screen of the stereoscopic image display device 11, the user can view the object image 58a with the left eye, and view the object image 58b with the right eye. As a result, the user can recognize the object image 58 stereoscopically. The object image 53b included in the right-eye image 51b is included in the area R, and therefore displayed on the screen of the stereoscopic image display device 11. On the other hand, the object image 53a included in the left-eye image 51a is not included in the area R, therefore not displayed on the screen of the stereoscopic image display device 11. Therefore, when the user sees the screen of the stereoscopic image display device 11, the user cannot view the object image 53a with the left eye, and can view the object image 53b with the right eye. This is a natural appearance for the user. That is, even when the user sees the actual space, there is the parallax between the right eye and the left eye and therefore, a certain object may be seen solely with one eye. For example, in the case where the user sees the outside view from a window, for example, there are portions of the object which cannot be seen with the right eye, but can be seen with the left eye, depending on a window frame. However, if the non-overlapping portion is included and displayed on the screen, portions (53a of FIG. 8) invisible to the user's eye (the left eye in the example shown in FIG. 8) becomes visible, thus causing the sense of discomfort for the user. Therefore, merely the superimposed portion is displayed on the stereoscopic image display device 11, thereby displaying the image which causes no sense of discomfort for the user.

On the other hand, the entirety of the left-eye image 51a and the entirety of the right-eye image 51b are displayed in the image display region 50 of the planar image display device 12 prior to and after the adjustment. More specifically, the superimposed portion and the non-overlapping portion of the left-eye image 51a and the right-eye image 51b are displayed in the image display region 50 of the planar image display device 12. As described above, in the stereoscopic image display device 11, merely the superimposed portion of the two images is displayed so as to make the stereoscopic image cause no sense of discomfort for the user. On the other hand, the left-eye image 51a and the right-eye image 51b displayed on the planar image display device 12 are viewed by both eyes of the user, and therefore the user can recognize the two images as different images. Therefore, even if the non-overlapping portion of the two images is displayed in addition to the superimposed portion, the image causes no sense of discomfort for the user. Rather, when the non-overlapping portion is included and displayed, the user can recognize the two images as different images, thereby allowing the easy recognition of the positional relationship of the two images. Therefore, the user can easily recognize the position of the object image included in the two images. Furthermore, because the non-overlapping portion is included and displayed on the planar image display device 12, the user can view an object to be imaged (this object to be imaged is not displayed on the stereoscopic image display device 11, or, even if displayed on the stereoscopic image display device 11, viewed with merely one eye of the user), which exists in the non-overlapping portion. For example, the object image 53a shown in FIG. 8, which is included in the left-eye image 51a, exists in the non-overlapping portion, and is not viewed with the user's left eye. In the case where the left-eye image 51a is moved in order to allow such object image 53a to be viewed with the user's left eye, it is difficult for the user to make adjustment, while seeing the stereoscopic image 61 displayed on the stereoscopic image display device 11. That is, the object image 53a is not displayed on the stereoscopic image display device 11, and therefore the user cannot recognize the position of the object image 53a. However, the non-overlapping portion is also displayed on the planar image display device 12, and therefore the user can adjust the position of the object image 53a, while viewing the object image 53a included in the non-overlapping portion. Therefore, the user can adjust the position of the object to be imaged which exists in the non-overlapping portion, and easily display the desired object to be imaged stereoscopically.

Furthermore, the user can adjust the respective positions of the left-eye image 51a and the right-eye image 51b, while seeing the stereoscopic image 61 displayed on the stereoscopic image display device 11, and therefore the user can easily adjust the stereoscopic image. As described above, when the user sees the stereoscopic image 61 displayed on the stereoscopic image display device 11, it may be difficult for the user to stereoscopically view the object image 63' shown in FIG. 7. If the user cannot view the object image 63' stereoscopically, it is difficult to determine the direction in which the left-eye image 51a and the right-eye image 51b should be adjusted by merely seeing the stereoscopic image display device 11 (determination of a position, to which the object image 63' should be moved in the direction perpendicular to the screen, cannot be made). On the other hand, the left-eye image 51a and the right-eye image 51b are made semi-transparent and superimposed one on the other, and displayed on the planar image display device 12. This allows the user to easily recognize how far the object images 53a and 53b, which are included in the two images, are apart from each other, by seeing the planar image display device 12. Therefore, the user may adjust the respective positions of the left-eye image 51a and the right-eye image 51b so as to make the object images 53a and 53b closer to each other (so that the object images 53a and 53b are superimposed one on the other), while seeing the left-eye image 51a and the right-eye image 51b displayed on the planar image display device 12.

Furthermore, the user can adjust the respective positions (the amount of shift in the horizontal direction) of the left-eye image 51a and the right-eye image 51b, while viewing the entirety of both the left-eye image 51a and the right-eye image 51b (the entirety of the image including the superimposed portion and the non-overlapping portion). Therefore, the positional relationship of the two images is easily recognizable to the user, thereby being adjusted easily. The user can easily adjust the two images, for example, even in the case where the user adjusts the two images to view a certain object to be imaged stereoscopically, and thereafter adjusts the two images to view another object to be imaged stereoscopically. That is, the entirety of both the left-eye image 51a and the right-eye image 51b are displayed on the planar image display device 12 and thus, even after the respective positions of the two images are adjusted, the positional relationship of the two images can be easily recognized. Therefore, the two images are easily adjusted.

As described above, the slider 55 of the position adjustment bar 54 is moved in the horizontal direction, and thereby the images displayed on the stereoscopic image display device 11 and the planar image display device 12 change. Specifically, by adjusting the respective positions of the left-eye image 51a and the right-eye image 51b in the horizontal direction, the user can display the object to be imaged, which is included in the stereoscopic image, so that the object to be imaged is moved in the direction perpendicular to the screen. This allows the user to adjust the respective positions of the left-eye image 51a and the right-eye image 51b displayed on the planar image display device 12, while seeing the stereoscopic image 61 displayed on the stereoscopic image display device 11. Therefore, the user can easily adjust the appearance of the stereoscopic image.

Figure 9:
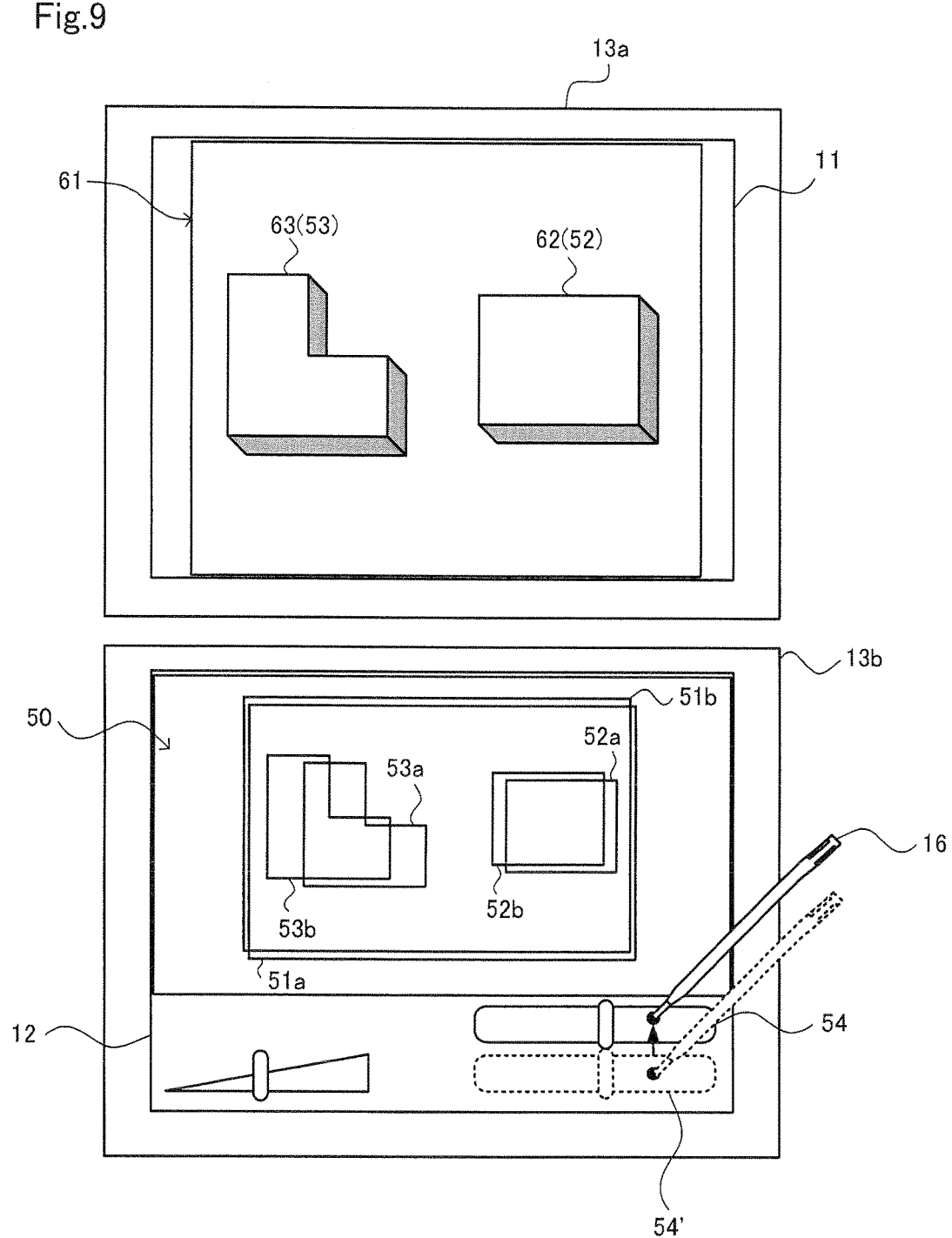
FIG. 9 is a diagram illustrating a state in which the user adjusts the respective positions of the left-eye image 51a and the right-eye image 51b in the vertical direction by using the position adjustment bar 54.

Next, the adjustment of the respective positions of the left-eye image 51a and the right-eye image 51b in the vertical direction will be described, with reference to FIG. 9. FIG. 9 is a diagram illustrating a state in which the user adjusts the respective positions of the left-eye image 51a and the right-eye image 51b in the vertical direction by using the position adjustment bar 54.

As shown in FIG. 9, if the user moves the stick 16 in the upward direction of the screen of the planar image display device 12 by using the stick 16, while touching the position adjustment bar 54 by using the stick 16, the position adjustment bar 54 also moves in the upward direction, according to the movement of the touch position. The position adjustment bar 54 can be moved in the vertical direction (the up-down directions) of the screen, the range of movement (a range in which the position adjustment bar 54 moves) of the position adjustment bar 54 is previously determined. The range of movement of the position adjustment bar 54 in the vertical direction is set smaller than the range of movement of the slider 55 of the position adjustment bar 54 in the horizontal direction.

When the position adjustment bar 54 moves in the vertical direction, the left-eye image 51*a* and/or the right-eye image 51*b* displayed in the image display region 50 of the planar image display device 12 also move in the vertical direction (the up-down directions). For example, when the position adjustment bar 54 is moved in the upward direction of the screen, the left-eye image 51*a* (or the right-eye image 51*b*) also moves in the upward direction of the screen, according to an amount of movement of the position adjustment bar 54 in the upward direction. According to the movement of the position adjustment bar 54 in the vertical direction, the left-eye image 51*a* and the right-eye image 51*b* displayed on the image display region 50 may be moved away from each other in the vertical direction, or merely an image selected by the stick 16 may be moved in the vertical direction.

On the other hand, according to the movement the position adjustment bar 54 in the vertical direction, the appearance of the stereoscopic image 61 displayed on the screen of the stereoscopic image display device 11 also changes. For example, if the left-eye image 51*a* and the right-eye image 51*b* are shifted from each other to a large extent in the vertical direction of the screen, and when the user sees the object image 62 included in the stereoscopic image 61, the object image 62 may appear different in shape, as compared to the actual object to be imaged 52, or appear poorly visible as stereoscopic image. However, the easy-to-see image which exerts the stereoscopic effect on the user can be displayed on the stereoscopic image display device 11 by the user adjusting the amount of the shift of the left-eye image 51*a* and the right-eye image 51*b* in the vertical direction.

As described above, by moving the position adjustment bar 54 in the vertical direction (the up-down directions) of the screen of the planar image display device 12, the amount of shift of the respective positions of the left-eye image 51*a* and the right-eye image 51*b* in the vertical direction can be adjusted. The amount of shift in the vertical direction is caused by the amount of shift of the physical positions between the left-eye image imaging section 18*a* and the right-eye image imaging section 18*b*. For example, if the left-eye image imaging section 18*a* is slightly deviated (deviated in the upward direction as compared to the left-eye image imaging section 18*a* shown in FIG. 2) in the vertical direction, as compared to the right-eye image imaging section 18*b* because of error in manufacturing, images deviated from each other in the vertical direction are taken. The user can adjust such amount of deviation between the left-eye image 51*a* and the right-eye image 51*b* in the vertical direction by using the position adjustment bar 54.

Normally, the deviation between the left-eye image 51*a* and the right-eye image 51*b* in the vertical direction is slight and thus, the user makes merely fine adjustment in the vertical direction. On the other hand, the user moves the object to be imaged, which is included in the stereoscopic image, in the depth direction or the frontward direction of the screen, and thus adjusts the amount of shift and the left-eye image 51*a* and the right-eye image 51*b* in the horizontal direction by sliding the slider 55 in the horizontal direction. That is, normally, the amount of adjustment in the vertical direction is smaller than the amount of adjustment in the horizontal direction. Therefore, in the present embodiment, the range of movement of the position adjustment bar 54 in the vertical direction is set smaller than the range of movement of the slider 55 of the position adjustment bar 54 in the horizontal direction. Therefore, the user can easily adjust the amount of shift of the left-eye image 51*a* and the right-eye image 51*b* in the horizontal direction, and easily make the fine adjustment in the vertical direction. That is, the slider 55 has large range of movement in the horizontal direction, and the position adjustment bar 54 has small range of movement in the vertical direction, and therefore the user can make adjustment in the horizontal direction to the large extent, and make merely fine adjustment in the vertical direction. Moreover, the slider 55 is slid in the horizontal direction for the adjustment in the horizontal direction, and the position adjustment bar 54 is moved in the vertical direction for the adjustment in the vertical direction, and therefore such operations are said to be intuitive and friendly operations for the user. The adjustment of the left-eye image 51*a* and the right-eye image 51*b* in the vertical direction may be made by a slider of an adjustment slider different from the position adjustment bar 54.

Figure 10:
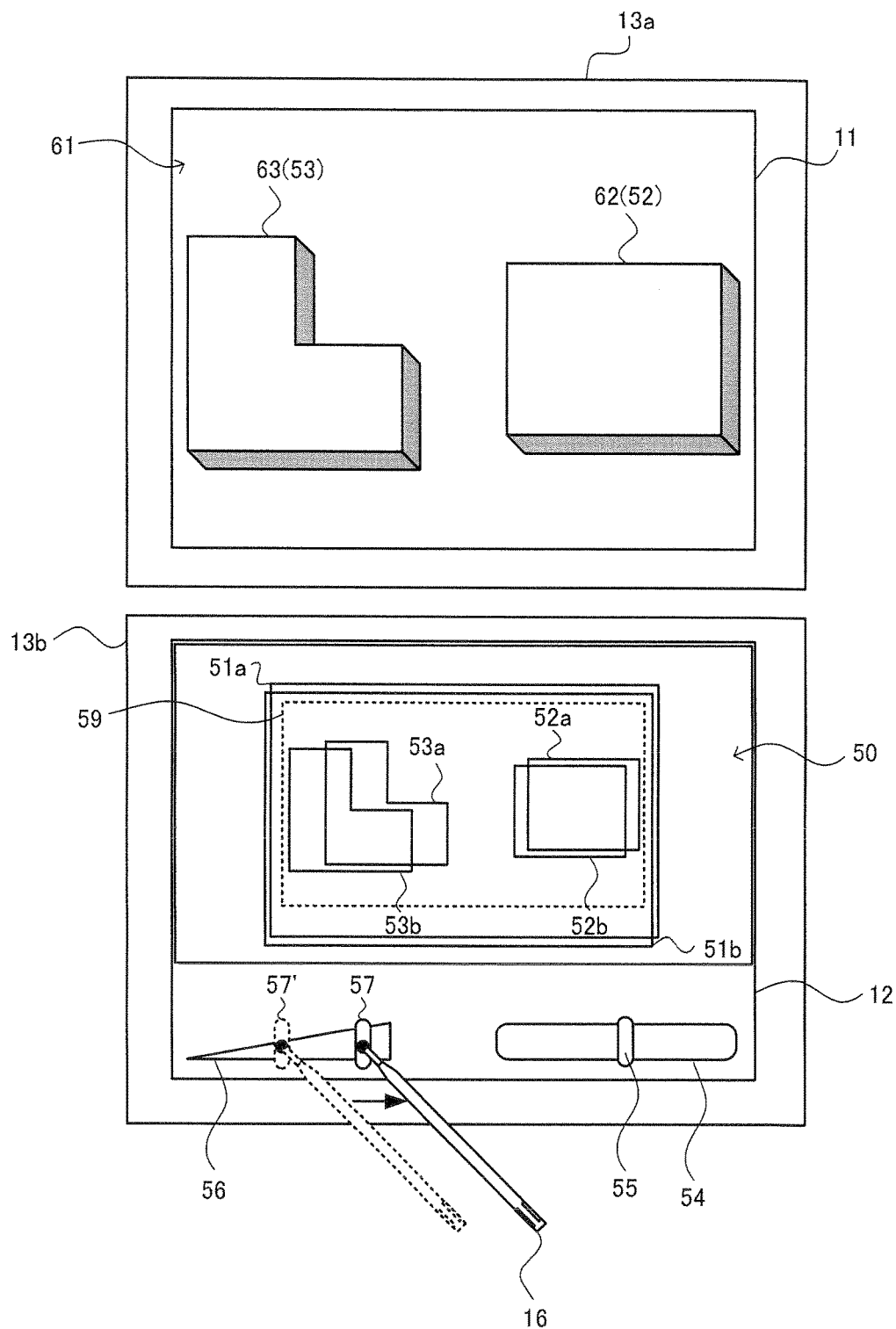
FIG. 10 is a diagram illustrating a state in which a zoom adjustment bar 56 is used for enlarging a stereoscopic image 61.

Next, a zoom operation will be described, with reference to FIG. 10. FIG. 10 is a diagram illustrating a state in which the stereoscopic image 61 is enlarged by using the zoom adjustment bar 56. As shown in FIG. 10, when the user moves the stick 16 in the rightward direction of the screen of the planar image display device 12, while touching the slider 57 of the zoom adjustment bar 56 by using the stick 16, the slider 57 moves in the rightward direction. 57' indicates the slider 57 prior to movement, and 57 indicates the slider 57 after the movement. The stereoscopic image 61 displayed on the stereoscopic image display device 11 is enlarged according to the movement of the slider 57. In FIG. 10, the stereoscopic image 61 is enlarged and thus, the object images 62 and 63, which are included in the stereoscopic image 61, are also enlarged. Since the stereoscopic image 61 is enlarged larger than the screen of the stereoscopic image display device 11, merely a portion thereof is displayed.

On the other hand, the left-eye image 51*a* and the right-eye image 51*b* displayed on the planar image display device 12 are not enlarged according to the movement of the slider 57. A stereoscopic image display frame 59 shown by the dotted line in FIG. 10 is displayed in the image display region 50 of the planar image display device 12. The stereoscopic image display frame 59 indicates an area corresponding to the area in which the stereoscopic image is displayed on the stereoscopic image display device 11. As described above, even though the stereoscopic image displayed on the stereoscopic image display device 11 is enlarged, the left-eye image 51*a* and the right-eye image 51*b* displayed on the planar image display device 12 are not enlarged, but the entirety thereof are displayed. Therefore, even when the stereoscopic image is enlarged, the respective positions of the left-eye image 51*a* and the right-eye image 51*b* is easily adjusted (the adjustment of the respective positions in the horizontal direction and the vertical direction by using the position adjustment bar 54). That is, the entirety of the left-eye image 51*a* and the entirety of the right-eye image 51*b* are displayed on the planar image display device 12, and thereby the user can easily understand the positional relationship of these images.

Figure 11:
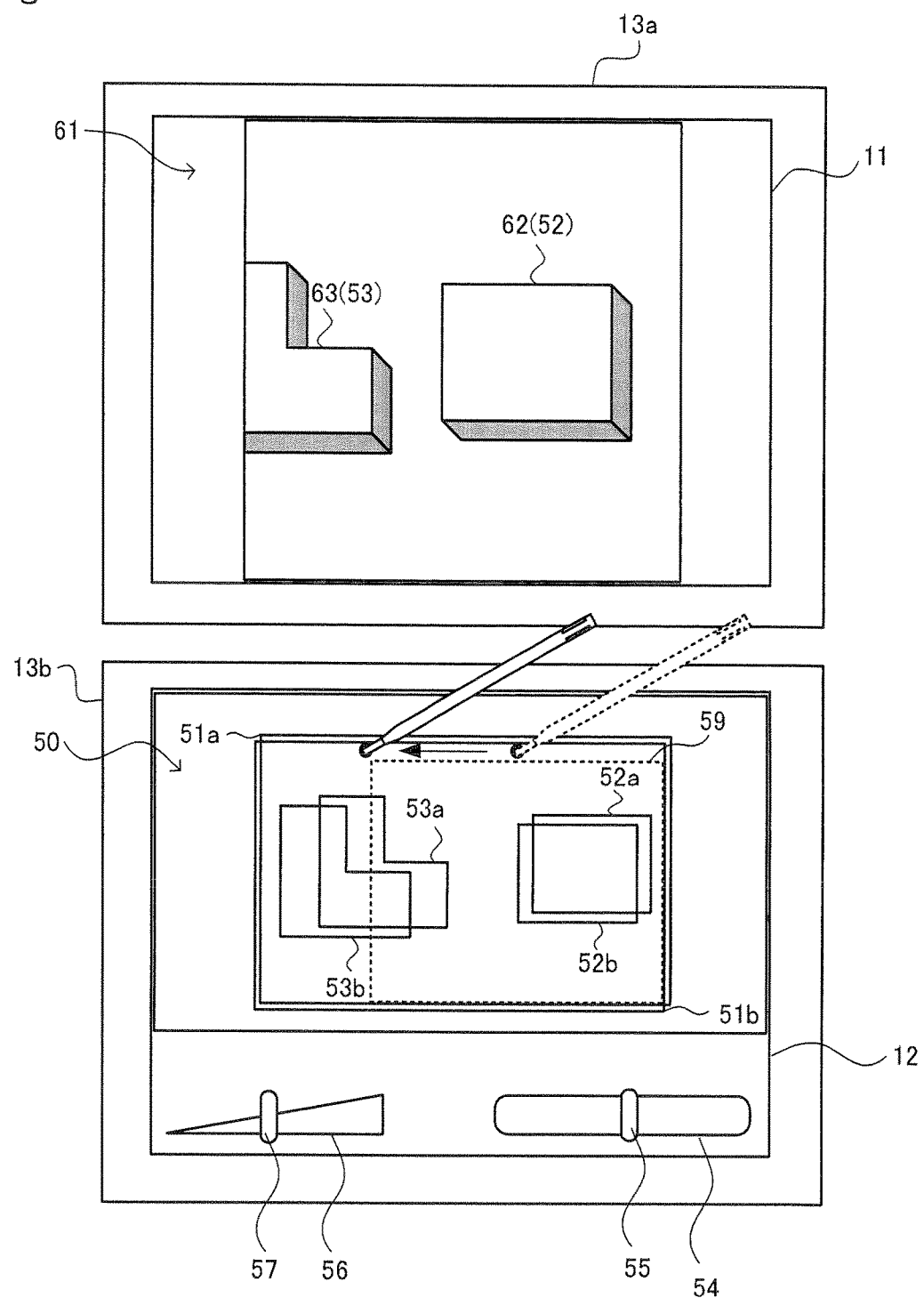
FIG. 11 is a diagram illustrating a state in which the stereoscopic image 61 is scrolled by a touch operation.

Next, a scrolling operation will be described, with reference to FIG. 11. FIG. 11 is a diagram illustrating a state in which the stereoscopic image 61 is scrolled by a touch operation. As shown in FIG. 11, when the user moves on the screen the left-eye image 51a or the right-eye image 51b, which are displayed on the planar image display device 12, while touching the left-eye image 51a or the right-eye image 51b by using the stick 16, the stereoscopic image 61 on the stereoscopic image display device 11 is scrolled. For example, when the user moves the left-eye image 51a or the right-eye image 51b in the leftward direction, while touching the left-eye image 51a or the right-eye image 51b by using the stick 16, the stereoscopic image 61 is scrolled in the rightward direction (the object image 62 included in the stereoscopic image 61 moves in the leftward direction). On the screen of the stereoscopic image display device 11 shown in FIG. 11, an image after the stereoscopic image 61 is scrolled is displayed. Since the stereoscopic image 61 is scrolled in the rightward direction, the object image 62 included in the stereoscopic image 61 moves leftward relative to the center of the screen, and a portion of the object image 63 is not displayed. By performing the scrolling operation, the user can scroll the stereoscopic image 61 in any direction of the screen.

On the other hand, the left-eye image 51a and the right-eye image 51b displayed on the planar image display device 12 are not scrolled by the above-described scrolling operation (the operation of moving the images in the right direction of the screen, while touching the images) by the user. The stereoscopic image display frame 59 is displayed in the image display region 50 of the planar image display device 12. As described above, even though the stereoscopic image displayed on the stereoscopic image display device 11 is scrolled, the left-eye image 51a and the right-eye image 51b displayed on the planar image display device 12 are not scrolled. Therefore, the adjustment of the respective positions of the left-eye image 51a and the right-eye image 51b (the adjustment of the respective positions in the horizontal direction and the vertical direction by use of the position adjustment bar 54) is easy. That is, the entirety of the left-eye image 51a and the entirety of the right-eye image 51b are displayed on the planar image display device 12, and thereby the user can easily understand the positional relationship of the images.

Figure 12:
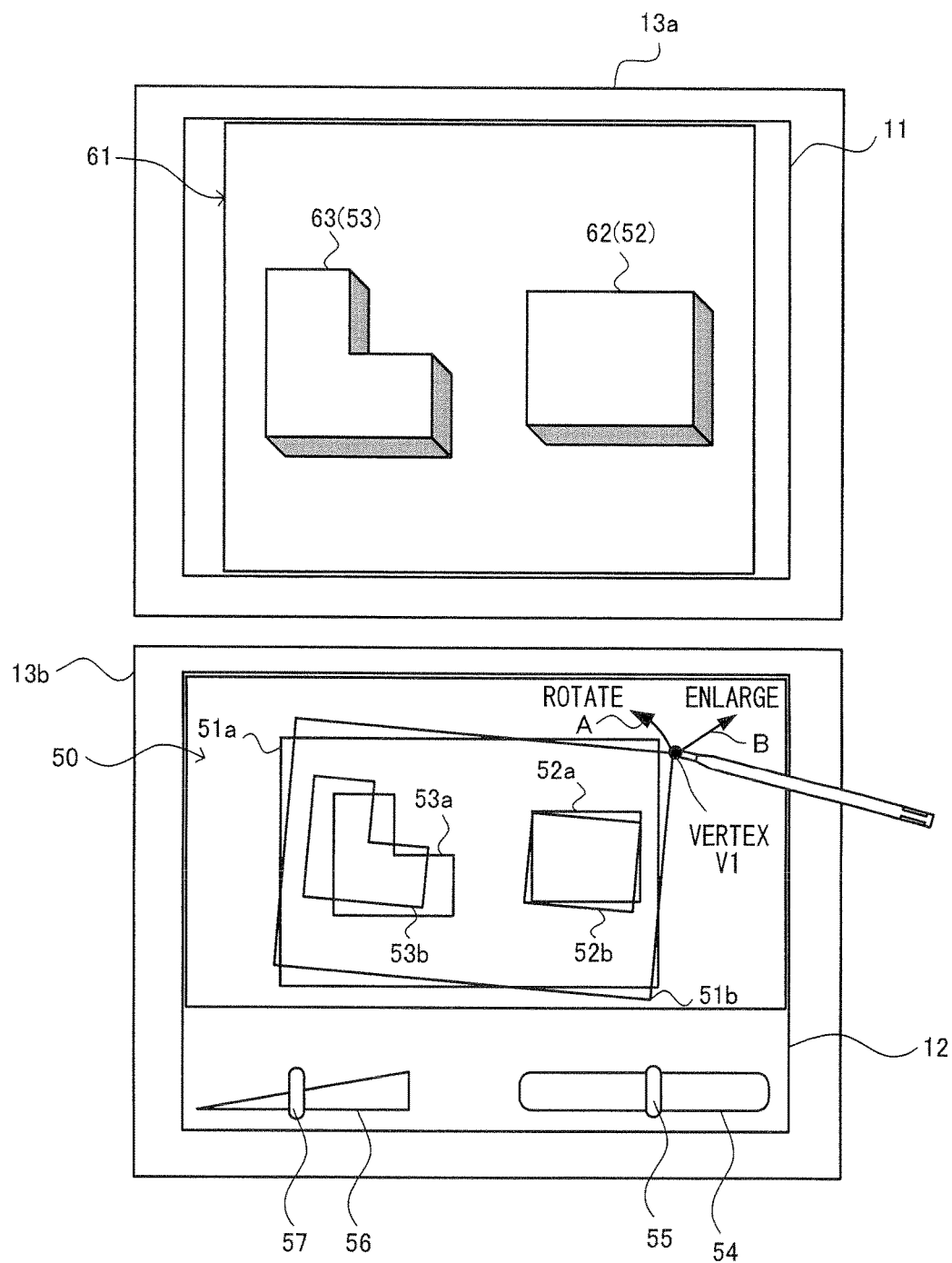
FIG. 12 is a diagram illustrating a state in which the stereoscopic image is adjusted by rotating or enlarging the right-eye image 51b.

Next, rotation and change in size of the left-eye image 51a or the right-eye image 51b will be described, with reference to FIG. 12. FIG. 12 is a diagram illustrating a state in which the stereoscopic image is adjusted by rotating or enlarging the right-eye image 51b. When the user moves, by using the stick 16, the predetermined position of the left-eye image 51a or the right-eye image 51b displayed on the planar image display device 12, while touching the left-eye image 51a or the right-eye image 51b, the left-eye image 51a or the right-eye image 51b rotates. For example, as shown in FIG. 12, when the user performs an operation so as to rotate the right-eye image 51b, while touching a vertex V1 of the right-eye image 51b (moves the stick 16 in a direction indicated by an arrow A shown in FIG. 12), the right-eye image 51b rotates. Furthermore, for example, when the user moves the stick 16 in a diagonal direction of the right-eye image 51b (moves the stick 16 in a direction indicated by an arrow B shown in FIG. 12), while touching the vertex V1 of the right-eye image 51b, the right-eye image 51b enlarges.

On the other hand, in accordance with the rotation or enlargement of the right-eye image 51b, the appearance of the stereoscopic image 61 displayed on the screen of the stereoscopic image display device 11 also changes. For example, in the case where the right-eye image 51b is rotated by a predetermined angle relative to the left-eye image 51a (more accurately, in the case where the object image 52b included in the right-eye image 51b is rotated by the predetermined angle relative to the object image 52a included in the left-eye image 51a), and when the user sees the object image 62 included in the stereoscopic image 61, the object image 62 may appear different in shape, as compared to the actual object to be imaged 52, or appear poorly visible as an stereoscopic image. Such rotation is likely to due to the error in manufacturing, or the like. For example, there is a case in manufacturing where the left-eye image imaging section 18a is provided being rotated by a predetermined angle. Therefore, the user can adjust the relative angle of rotation of the left-eye image 51a and the right-eye image 51b by rotating the left-eye image 51a or the right-eye image 51b. This allows the user to display on the stereoscopic image display device 11 an easy-to-see image which exerts the stereoscopic effect on the user.

Also, if the right-eye image 51b is small as compared to the left-eye image 51a, (more accurately, the object image 52b included in the right-eye image 51b is smaller than the object image 52a included in the left-eye image 51a) for example, and when the user sees the object image 62 included in the stereoscopic image 61, the object image 62 may appear different in shape, as compared to the actual object to be imaged 52, or appear poorly visible as an stereoscopic image. Such difference in size may be caused by a state during imaging (for example, difference in an operation of a zoom mechanism between the left-eye image imaging section 18a and the right-eye image imaging section 18b). The user can adjust the relative sizes of the left-eye image 51a and the right-eye image 51b by enlarging or reducing the left-eye image 51a or the right-eye image 51b by the above-described operation. This allows the user to display on the stereoscopic image display device 11 the easy-to-see image which exerts the stereoscopic effect on the user.

(Details of Image Display Control Process)

Figure 13:
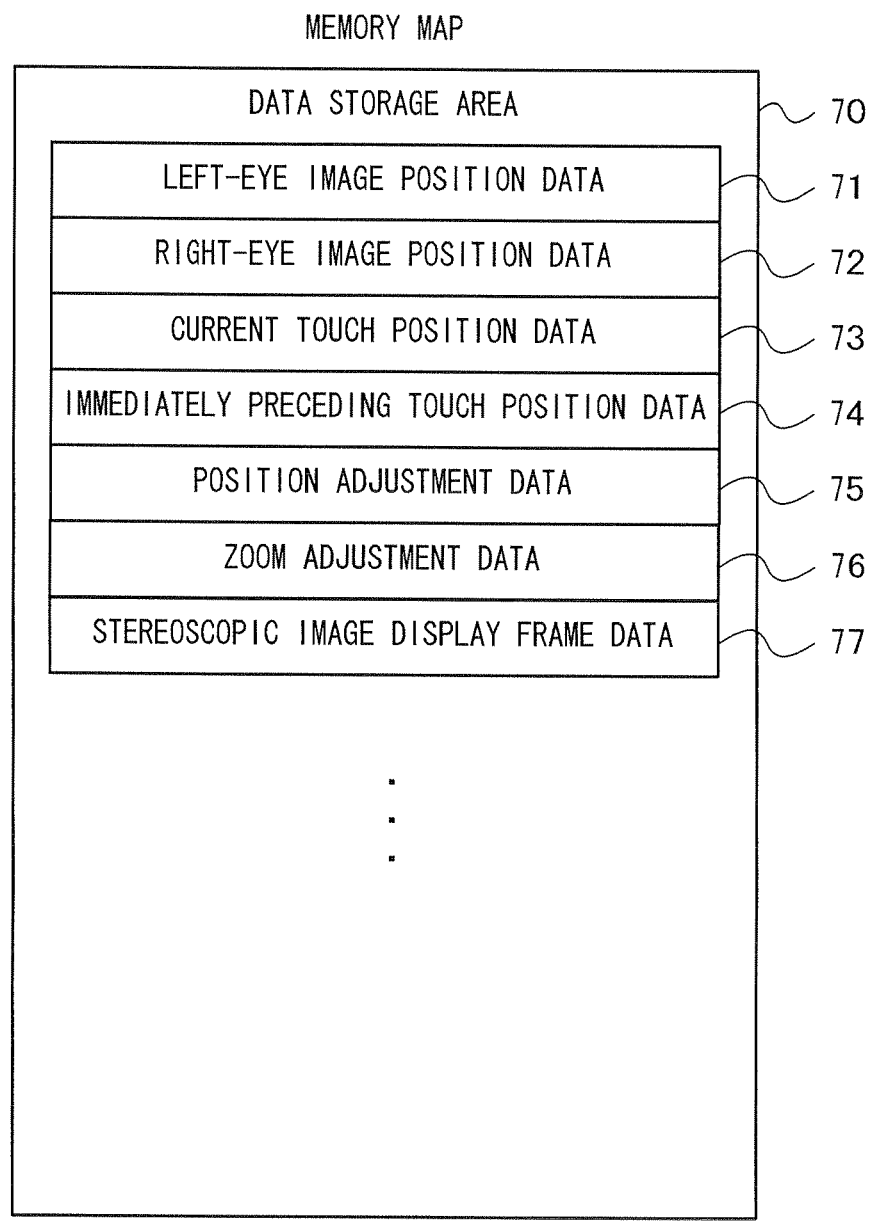
FIG. 13 is a diagram illustrating a memory map of a main memory 31 of the image display apparatus 10

Next, an image display control process according to the present embodiment will be described in detail, with reference to FIG. 13 to FIG. 18. Initially, main data which is stored in the main memory 31 during the image display control process will be described. FIG. 13 is a diagram illustrating a memory map of the main memory 31 of the image display apparatus 10. As shown in FIG. 13, a data storage area 70 is provided in the main memory 31. The data storage area 70 stores therein left-eye image position data 71, right-eye image position data 72, current touch position data 73, immediately preceding touch position data 74, position adjustment data 75, zoom adjustment data 76, stereoscopic image display frame data 77, and the like. Other data stored in the main memory 31 are a program for executing the image display control process, left-eye image data, right-eye image data, image data of the position adjustment bar, image data of the zoom adjustment bar, and the like.

The left-eye image position data 71 is data indicative of a display position of the left-eye image 51a, indicating a coordinate value of the center of the left-eye image 51a. The right-eye image position data 72 is data indicative of a display position of the right-eye image 51b, indicating a coordinate value of the center of the right-eye image 51b.

The current touch position data 73 is data indicative of a coordinate value, which is detected by the touch panel 15 in a current frame, of the touch position. If the touch position is not detected in the current frame, a value, which indicates that the touch position is not detected, is stored in the current touch position data 73. The immediately preceding touch position data 74 is data indicative of a coordinate value detected by the touch panel 15 in an immediately preceding frame. If the touch position is not detected in the immediately preceding frame, a value, which indicates that the touch position is not detected, is stored in the immediately preceding touch position data 74.

The position adjustment data 75 is data regarding the position adjustment bar 54. Specifically, the position adjustment data 75 includes data indicative of a coordinate value of a display position of the position adjustment bar 54, and data indicative of the position of the slider 55 on the position adjustment bar 54.

The zoom adjustment data 76 is data regarding the zoom adjustment bar 56, indicative of the position of the slider 57 on the zoom adjustment bar 56.

The stereoscopic image display frame data 77 is data indicative of the position and size of the stereoscopic image display frame 59 displayed on the planar image display device 12.

Figure 14:
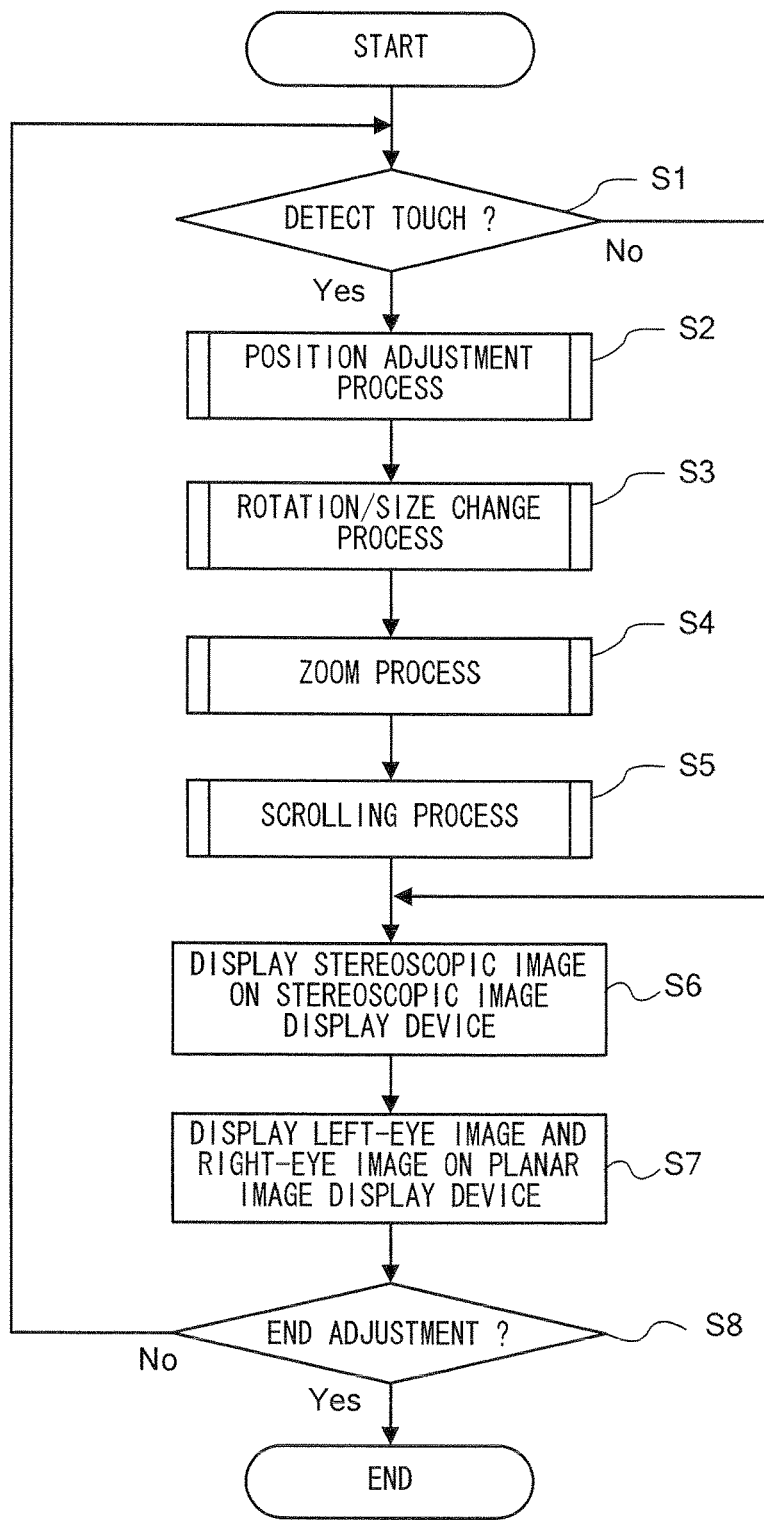
FIG. 14 is a main flowchart illustrating in detail an image display control process according to a first embodiment.

Next, the image display control process will be described in detail, with reference to FIG. 14. FIG. 14 is a main flowchart illustrating in detail the image display control process according to the first embodiment. When the image display apparatus 10 is powered on, the CPU 30 of the image display apparatus 10 executes a boot program stored in the ROM 32 to initialize each unit, such as the main memory 31. Next, the main memory 31 reads the image display control program stored in the ROM 32, and the CPU 30 starts executing the program. The main memory 31 reads the left-eye image 51a and the right-eye image 51b stored in the stored data memory 34. The flowchart shown in FIG. 14 is a flowchart showing a process which is performed after the above-described process is completed. The description of processes, which does not directly relate to the present invention, is omitted in FIG. 14. A processing loop of step S1 through step S8 shown in FIG. 14 is repeatedly executed for each frame (for example, 1/30 second, which is referred to as frame time).

Initially, in step S1, the CPU 30 detects that a touch has occurred on the touch panel 15. If the touch has occurred on the touch panel 15, the CPU 30 stores the detected touch position in the main memory 31 as the current touch position data 73, and next executes a process of step S2. On the other hand, if the touch has not occurred on the touch panel 15, the CPU 30 stores in the main memory 31 the value which indicates that the touch position has not been detected as the current touch position data 73, and next executes a process of step S6.

Figure 15:
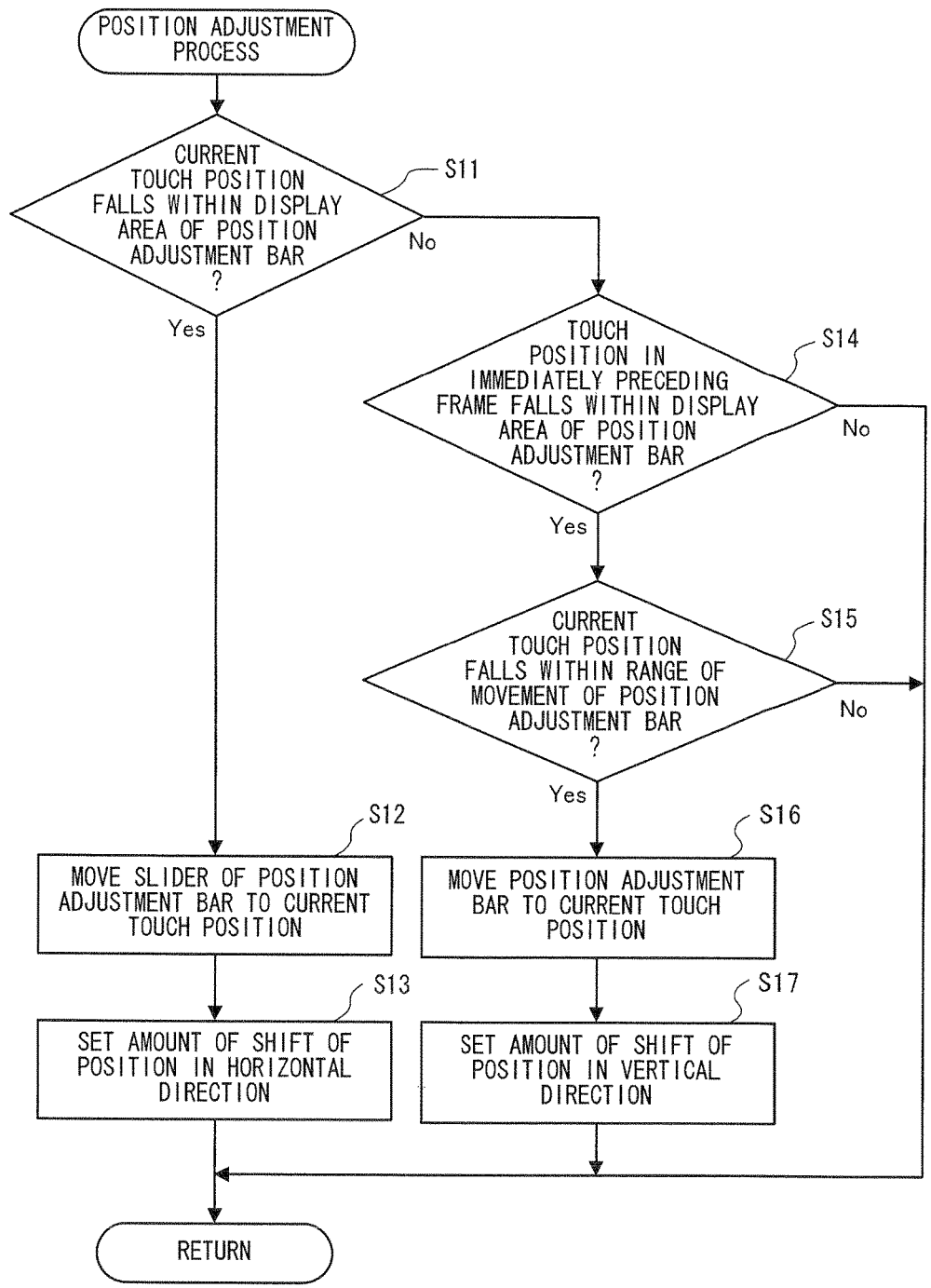
FIG. 15 is a flowchart illustrating in detail a position adjustment process (step S2)

In step S2, the CPU 30 executes a position adjustment process. In step S2, the CPU 30 adjusts the respective positions of the left-eye image 51a and the right-eye image 51b, based on the detected touch position. The position adjustment process in step S2 will be described in detail, with reference to FIG. 15. FIG. 15 is a flowchart showing in detail the position adjustment process (step S2).

In step S11, the CPU 30 determines whether or not the current touch position falls within the display area of the position adjustment bar 54. Specifically, the CPU 30 refers to the current touch position data 73 stored in the main memory 31 to acquire the current touch position (the touch position detected in step S1 of the current processing loop). Next, the CPU 30 refers to the position adjustment data 75 to determine whether or not the acquired current touch position falls within the display area (the area in which the position adjustment bar 54 is displayed on the screen of the planar image display device 12) of the position adjustment bar 54. If the determination result is affirmative, the CPU 30 next executes a process of step S12. On the other hand, if the determination result is negative, the CPU 30 next executes a process of step S14.

In step S12, the CPU 30 moves the slider 55 of the position adjustment bar 54 to the current touch position. In step S12, the slider 55 of the position adjustment bar 54 is moved on the position adjustment bar 54 in the horizontal direction. Specifically, the CPU 30 calculates a position on the position adjustment bar 54, which corresponds to the current touch position, and stores the calculated position in the position adjustment data 75 of the main memory 31. Next, the CPU 30 executes a process of step S13.

In step S13, the CPU 30 sets the amount of shift of the respective positions in the horizontal direction. Specifically, the CPU 30 calculates the amount of shift of the left-eye image 51a and the right-eye image 51b in the horizontal direction (the left-right (X-axis) direction of the screen), based on the position calculated in step S12 of the slider 55 on the position adjustment bar 54, and stores the calculated amount of shift in the main memory 31. If the slider 55 is present at a position predetermined distance away from the left end of the position adjustment bar 54, the CPU 30 sets the amount of shift in the horizontal direction, according to the predetermined distance. The amount of shift in the horizontal direction is an amount of shift (a difference in X coordinate values) of a coordinate value of the center of the left-eye image 51a and a coordinate value of the center of the right-eye image 51b relative to the X axis. For example, the CPU 30 sets the amount of shift in the horizontal direction as positive in a state in which the amount of shift in the horizontal direction when the slider 55 is present at a position P0 (the center position of the position adjustment bar 54, for example) on the position adjustment bar 54 is defined as 0 and if the slider 55 is present rightward relative to the position P0. On the other hand, for example, if the slider 55 is present leftward relative to the position P0, the CPU 30 sets the amount of shift in the horizontal direction as negative. If the amount of shift in the horizontal direction is positive, the left-eye image 51a is positioned on the left side of the screen, as compared to the right-eye image 51b. If the amount of shift in the horizontal direction is negative, the left-eye image 51a is positioned on the right side of the screen, as compared to the right-eye image 51b. Next, the CPU 30 ends the position adjustment process.

On the other hand, the CPU 30 determines in step S14 whether or not the touch position in the immediately preceding frame falls within the display area of the position adjustment bar 54. The touch position in the immediately preceding frame refers to the touch position detected in step S1 in the processing loop immediately before the current processing loop. Specifically, the CPU 30 refers to the immediately preceding touch position data 74 in the main memory 31 to determine whether or not the immediately preceding touch position is present within the display area of the position adjustment bar 54. If the determination result is affirmative, the CPU 30 next executes a process of step S15. On the other hand, if the determination result is negative, the CPU 30 ends the position adjustment process.

In step S15, the CPU 30 determines whether or not the current touch position falls within the range of movement of the position adjustment bar 54. The position adjustment bar 54 can move in the vertical direction (the up-down directions) of the screen within a predetermined range. Therefore, in step S15, it is determined whether or not the current touch position falls within the range of movement. If the determination result is affirmative, the CPU 30 next executes a process of step S16. On the other hand, if the determination result is negative, the CPU 30 ends the position adjustment process.

In step S16, the CPU 30 moves the position adjustment bar 54 to the current touch position. In step S16, the position adjustment bar 54 is moved in the vertical direction (the up-down directions) of the screen. Specifically, the CPU 30 calculates a movement vector indicative of the movement of the position adjustment bar 54 in the vertical (Y-axis) direction of the screen, based on the current touch position indicated by the current touch position data 73. For example, the CPU 30 calculates a point of intersection between the display area of the position adjustment bar 54 and a line segment, which passes through the current touch position and which is parallel to the Y axis, and the CPU 30 calculates, as the movement vector, a vector extending from the calculated point of intersection toward the current touch position. The CPU 30 then adds the calculated movement vector to a position vector indicative of the display position of the position adjustment bar 54, which is indicated by the position adjustment data 75, thereby calculating the position of the position adjustment bar 54. The CPU 30 stores in the main memory 31 the calculated position of the position adjustment bar 54 as the position adjustment data 75. Next, the CPU 30 executes a process of step S17.

In step S17, the CPU 30 sets the amount of shift of the respective positions in the vertical direction. Specifically, the CPU 30 calculates the amount of shift of the left-eye image 51a and the right-eye image 51b in the vertical direction (the up-down (Y-axis) direction of the screen), based on the position calculated in step S16 of the position adjustment bar 54, and stores the obtained amount of shift in the main memory 31. More specifically, the CPU 30 calculates the amount of shift of the respective positions in the vertical direction, according to the coordinate value of the Y axis of the position adjustment bar 54. The amount of shift of the respective positions in the vertical direction is the amount of shift (a difference in Y coordinate values) of the coordinate value of the center of the left-eye image 51a and the coordinate value of the center of the right-eye image 51b relative to the Y axis. For example, the CPU 30 sets the amount of shift in the vertical direction as positive in a state in which the amount of shift in the horizontal direction when the position adjustment bar 54 is present at the predetermined position (the center of the position adjustment bar 54 in the range of movement in the vertical direction, for example) is defined as 0, and if the position adjustment bar 54 is present upward relative to the predetermined position. On the other hand, for example, if the position adjustment bar 54 is present downward relative to the predetermined position, the CPU 30 sets the amount of shift in the vertical direction as negative. If the amount of shift in the vertical direction is positive, the left-eye image 51a is positioned on the upper side of the screen, as compared to the right-eye image 51b. If the amount of shift in the vertical direction is negative, the left-eye image 51a is positioned on the lower side of the screen, as compared to the right-eye image 51b. Next, the CPU 30 ends the position adjustment process.

Returning to FIG. 14, the CPU 30 next executes a process of step S3 after the process of step S2.

Figure 16:
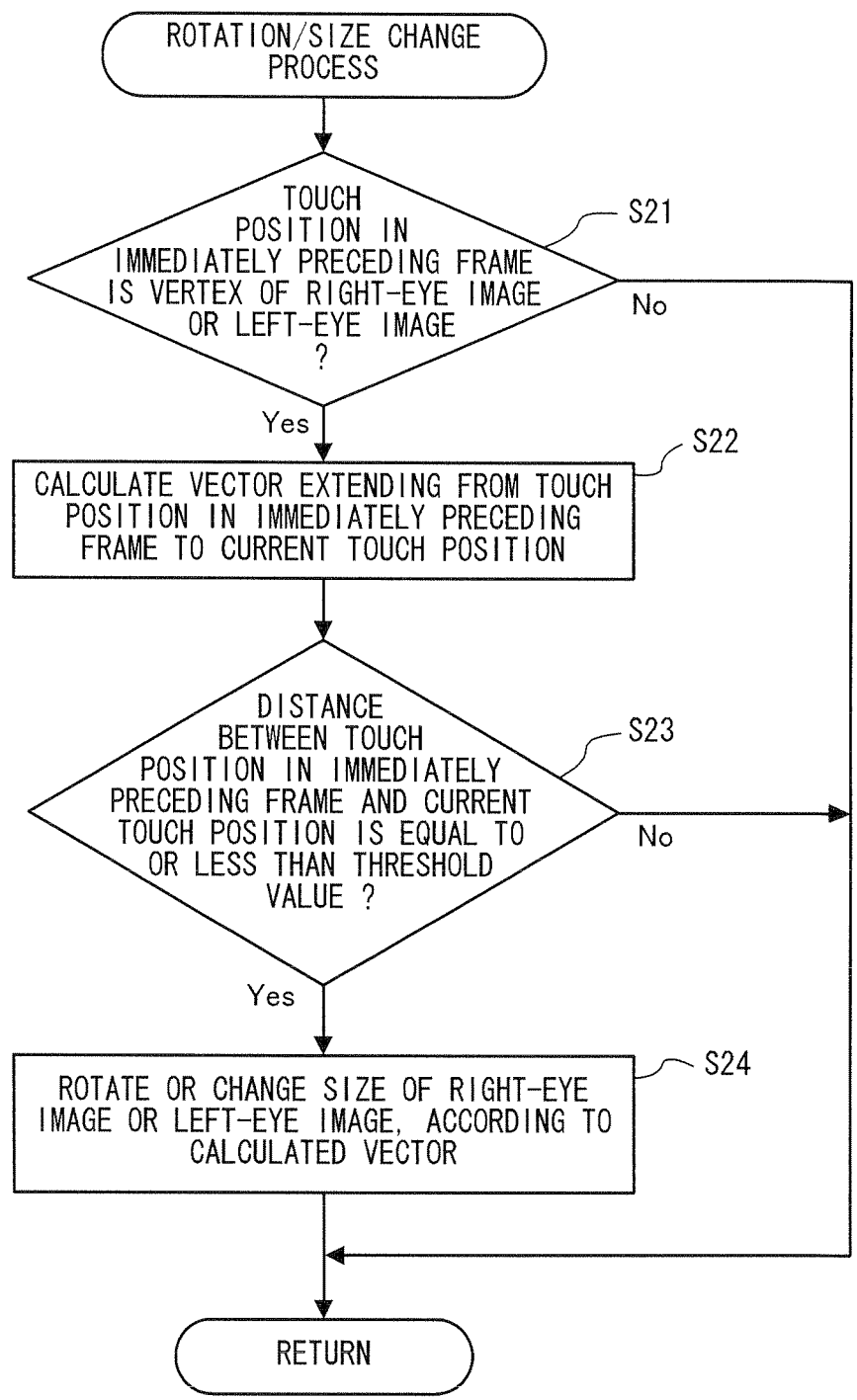
FIG. 16 is a flowchart illustrating in detail a rotation/size change process (step S3)

In step S3, the CPU 30 executes a rotation/size change process. In step S3, the CPU 30 rotates or changes the size of the left-eye image 51a or the right-eye image 51b, based on the touch position detected in step S1. The rotation/size change process in step S3 will be described in detail, with reference to FIG. 16. FIG. 16 is a flowchart showing in detail the rotation/size change process (step S3).

In step S21, the CPU 30 determines whether or not the touch position in the immediately preceding frame is a vertex of the left-eye image 51a or the right-eye image 51b. Specifically, the CPU 30 refers to the immediately preceding touch position data 74 to determine whether or not the immediately preceding touch position falls within a predetermined area in which the vertex of the left-eye image 51a or the right-eye image 51b is included. If the determination result is affirmative, the CPU 30 next executes a process of step S22. On the other hand, if the determination result is negative, the CPU 30 ends the rotation/size change process.

In step S22, the CPU 30 calculates a vector extending from the touch position in the immediately preceding frame to the current touch position. Specifically, the CPU 30 refers to the current touch position data 73 and the immediately preceding touch position data 74 to calculate a vector in which the immediately preceding touch position is a start point of the vector and the current touch position is an end point of the vector. The CPU 30 stores the calculated vector in the main memory 31. Next, the CPU 30 executes a process of step S23.

In step S23, the CPU 30 determines whether or not a distance between the touch position in the immediately preceding frame and the current touch position is equal to or less than a threshold value. An amount of rotation or change in size of the image (the left-eye image 51a or the right-eye image 51b) selected by the immediately preceding touch position is restricted by the process of step S23. Specifically, the CPU 30 determines whether or not the magnitude of vector calculated in step S22 is equal to or less than a predetermined threshold value. If the determination result is affirmative, the CPU 30 next executes a process of step S24. On the other hand, if the determination result is negative, the CPU 30 ends the rotation/size change process.

In step S24, the CPU 30 rotates or changes the size of the right-eye image or the left-eye image, according to the calculated vector. Specifically, the CPU 30 rotates or changes the size of the image selected by the immediately preceding touch position, based on the direction and the magnitude of vector calculated in step S22. For example, if the calculated direction of vector is a diagonal direction of the selected image (if equal to or less than the predetermined angle), the CPU 30 enlarges the selected image, according to the magnitude of vector. Here, the diagonal direction indicates a direction extending from the center of the selected image toward the vertex designated by the immediately preceding touch position. For example, if the calculated direction of vector is opposite to the above-described diagonal direction, the CPU 30 reduces the selected image. Also, for example, if the calculated direction of vector is perpendicular to the above-described diagonal direction, (if within the range of the predetermined angle) the CPU 30 rotates the selected image about the center of the selected image, according to the magnitude of vector. Next, the CPU 30 ends the rotation/size change process.

Returning to FIG. 14, the CPU 30 next executes a process of step S4 after the process of step S3.

Figure 17:
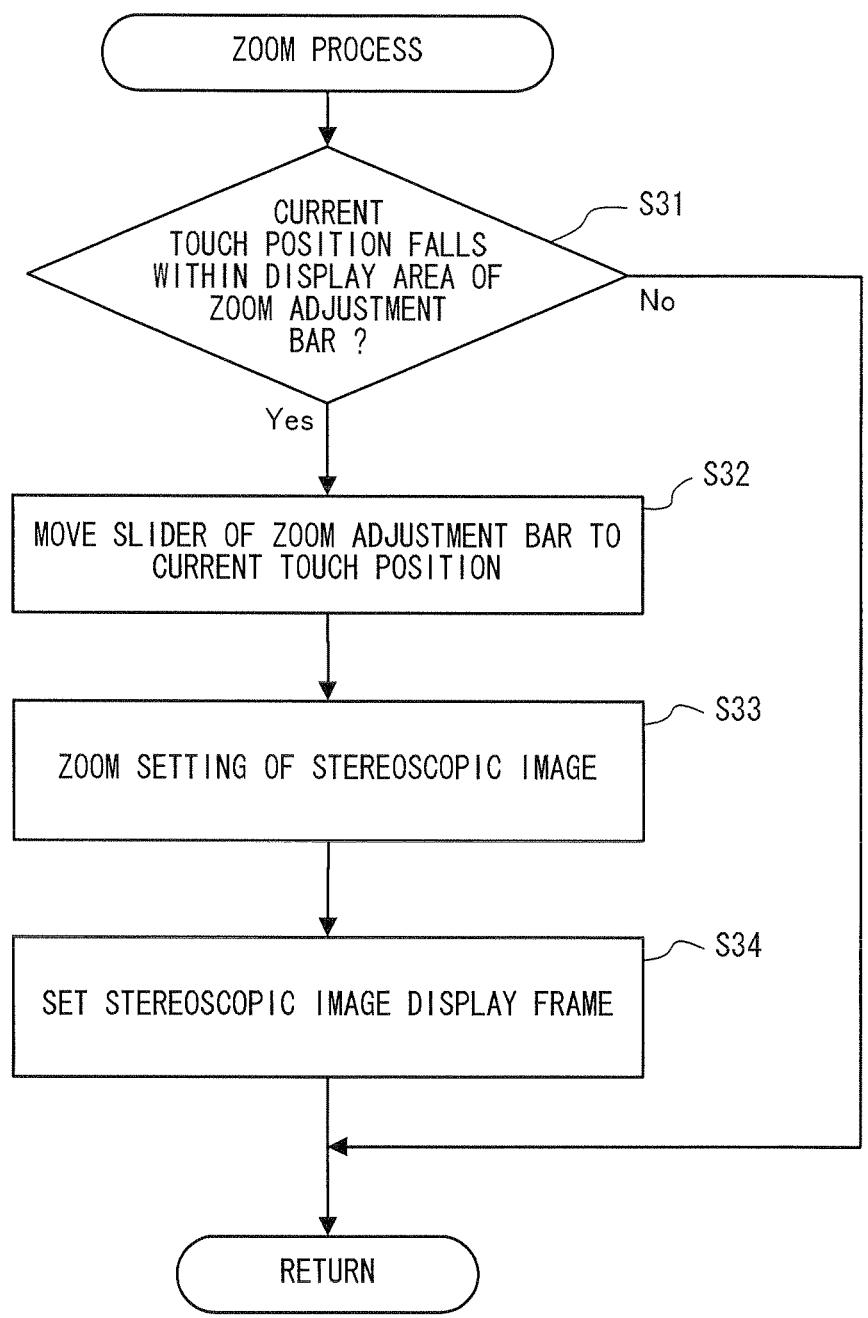
FIG. 17 is a flowchart illustrating in detail a zoom process (step S4)

In step S4, the CPU 30 executes a zoom process. In step S4, the CPU 30 zooms (enlarges or reduces) the stereoscopic image 61 displayed on the stereoscopic image display device 11, based on the touch position detected in step S1. The zoom process in step S4 will be described in detail, with reference to FIG. 17. FIG. 17 is a flowchart showing in detail the zoom process (step S4).

In step S31, the CPU 30 determines whether or not the current touch position falls within the display area of the zoom adjustment bar 56. Specifically, the CPU 30 refers to the current touch position data 73 of the main memory 31 to determine whether or not the current touch position is present within the display area (an area in which the zoom adjustment bar 56 is displayed on the screen of the planar image display device 12) of the zoom adjustment bar 56. If the determination result is affirmative, the CPU 30 next executes a process of step S32. On the other hand, if the determination result is negative, the CPU 30 ends the zoom process.

In step S32, the CPU 30 moves the slider 57 of the zoom adjustment bar 56 to the current touch position. In step S32, the slider 57 of the zoom adjustment bar 56 is moved on the zoom adjustment bar 56 in the horizontal direction. Specifically, the CPU 30 calculates a position on the zoom adjustment bar 56, which corresponds to the current touch position, and stores the calculated position in the zoom adjustment data 76 of the main memory 31. Next, the CPU 30 executes a process of step S33.

In step S33, the CPU 30 makes a zoom setting of the stereoscopic image 61. The process of step S33 is a setting process for performing zoom of the stereoscopic image 61, which is displayed on the stereoscopic image display device 11 in step S6 described below. Specifically, the CPU 30 determines a level of enlargement or reduction of both the left-eye image 51a and the right-eye image 51b, according to the position of the slider 57 of the zoom adjustment bar 56, and stores the determined level in the main memory 31. Next, the CPU 30 executes a process of step S34.

In step S34, the CPU 30 sets the stereoscopic image display frame 59. Specifically, the CPU 30 calculates an area of the stereoscopic image 61, which is displayed on the stereoscopic image display device 11, based on the zoom setting of the stereoscopic image 61 in step S33. That is, the CPU 30 calculates the position and size of the stereoscopic image display frame 59, and stores the obtained data in the main memory 31 as the stereoscopic image display frame data 77. The stereoscopic image display frame 59 is a frame which is displayed in the image display region 50 of the planar image display device 12, and indicative of the areas of the left-eye image 51a and the right-eye image 51b, which correspond to the area of the stereoscopic image 61 displayed on the stereoscopic image display device 11. When the stereoscopic image 61 is enlarged by zooming in, there is a case where merely respective positions of the left-eye image 51a and the right-eye image 51b are displayed on the stereoscopic image display device 11. Even if the stereoscopic image 61 is enlarged by zooming in, if the entirety of the left-eye image 51a and the entirety of the right-eye image 51b are displayed on the stereoscopic image display device 11, the stereoscopic image display frame 59 is not displayed. Next, the CPU 30 ends the zoom process.

Returning to FIG. 14, the CPU 30 next executes a process of step S5 after the process of step S4.

Figure 18:
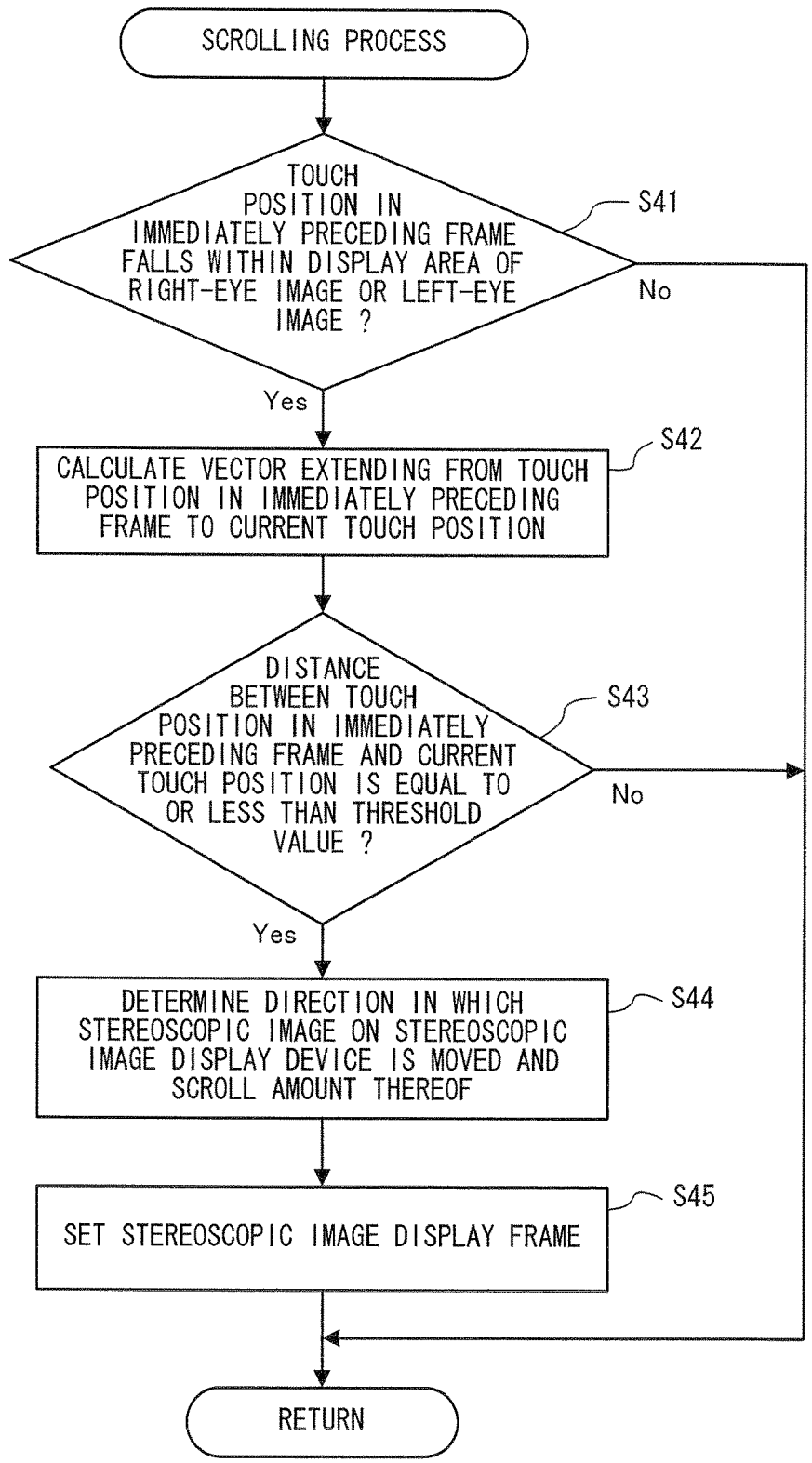
FIG. 18 is a flowchart illustrating in detail a scrolling process (step S5)

In step S5, the CPU 30 executes a scrolling process. In step S5, the CPU 30 scrolls the stereoscopic image 61 displayed on the stereoscopic image display device 11, based on the touch position detected in step S1. The scrolling process in step S5 will be described in detail, with reference to FIG. 18. FIG. 18 is a flowchart showing in detail the scrolling process (step S5).

In step S41, the CPU 30 determines whether or not the touch position in the immediately preceding frame falls within the display area of the left-eye image 51a or the right-eye image 51b. Specifically, the CPU 30 refers to the immediately preceding touch position data 74 to determine whether or not the immediately preceding touch position falls within the display area of the left-eye image 51a or the right-eye image 51b. If the determination result is affirmative, the CPU 30 next executes a process of step S42. On the other hand, if the determination result is negative, the CPU 30 ends the scrolling process.

In step S42, the CPU 30 calculates a vector extending from the touch position in the immediately preceding frame to the current touch position. Specifically, the CPU 30 refers to the current touch position data 73 and the immediately preceding touch position data 74 to calculate a vector in which the immediately preceding touch position is the start point of the vector and the current touch position is the end point of the vector. The CPU 30 stores the obtained vector in the main memory 31. Next, the CPU 30 executes a process of step S43.

In step S43, the CPU 30 determines whether or not the distance between the touch position in the immediately preceding frame and the current touch position is equal to or less than the threshold value. An amount of scrolling of the stereoscopic image 61 is restricted by the process of step S43. Specifically, the CPU 30 determines whether or not the magnitude of vector calculated in step S42 is equal to or less than the predetermined threshold value. If the determination result is affirmative, the CPU 30 next executes a process of step S44. On the other hand, if the determination result is negative, the CPU 30 ends the scrolling process.

In step S44, the CPU 30 sets a direction in which the stereoscopic image 61 displayed on the stereoscopic image display device 11 is scrolled and a scroll amount thereof. Specifically, the CPU 30 determines a direction opposite to the direction of the vector calculated in step S42, and stores the determined direction in the main memory 31 as the direction in which the stereoscopic image 61 is scrolled. Therefore, the object image included in the stereoscopic image 61 moves in the direction in which the user moves the stick 16. Also, the CPU 30 determines the scroll amount, according to the magnitude of vector which is calculated in step S42, and stores the determined scroll amount in the main memory 31. Next, the CPU 30 executes a process of step S45.

In step S45, the CPU 30 sets the stereoscopic image display frame 59. The process of step S45 is the same as that of step S34 described above. Specifically, the CPU 30 calculates the area of the stereoscopic image 61 displayed on the stereoscopic image display device 11, based on the scroll setting of the stereoscopic image 61 in step S44. That is, the CPU 30 calculates the position of the stereoscopic image display frame 59, and stores the calculated position in the main memory 31 as the stereoscopic image display frame data 77. Next, the CPU 30 ends the scrolling process.

Returning to FIG. 14, the CPU 30 next executes a process of step S6 after the process of step S5.

In step S6, the CPU 30 displays the stereoscopic image 61 on the stereoscopic image display device 11. In step S6, the left-eye image 51a and the right-eye image 51b, which have been adjusted in steps S2 to S5, are displayed on the stereoscopic image display device 11, thereby displaying the stereoscopic image 61. Specifically, the CPU 30 shifts the respective positions of the left-eye image 51a and the right-eye image 51b by the amounts of shift, which has been set by the process of step S2, in the horizontal direction and the vertical direction, and synthesizes the left-eye image 51a and the right-eye image 51b. Also, the CPU 30 synthesizes the left-eye image 51a and the right-eye image 51b by using the image (the left-eye image 51a or the right-eye image 51b), which has been rotated or changed in size in step S3. More specifically, the CPU 30 divides each of the two images, which have been adjusted in step S2 or S3, into rectangle-shaped images each having one line of pixels aligned in the vertical direction, and alternately aligns the rectangle-shaped images of the two images, thereby synthesizing the two images. Furthermore, the CPU 30 sets the display area, based on the zoom setting set by the zoom process in step S4, or the scroll setting set by the scrolling process in step S5. For example, if the zoom setting has been made in step S4, the CPU 30 sets the display area, according to the determined level of enlargement or reduction, and enlarges or reduces (digital zoom) the areas of the left-eye image 51a and the right-eye image 51b, which correspond to the display area. Moreover, for example, if the scroll setting has been made in step S5, the CPU 30 sets the display area, based on the scrolling direction and the scroll amount. Merely a superimposed area when the left-eye image 51a and the right-eye image 51b adjusted in steps S2 to S5 are superimposed one on the other is set as the display area. The CPU 30 then displays on the stereoscopic image display device 11 the display area of the synthesized image, thereby displaying the stereoscopic image. Next, the CPU 30 executes a process of step S7.

In step S7, the CPU 30 displays the left-eye image 51a and the right-eye image 51b on the planar image display device 12. In step S7, the left-eye image 51a and the right-eye image 51b adjusted in steps S2 to S5 are displayed on the planar image display device 12. Specifically, the CPU 30 shifts the position of the left-eye image 51a and the position of the right-eye image 51b in the horizontal and vertical directions by the respective amounts of shift set by the process in step S2, makes the two images semi-transparent and superimposes one on the other. The CPU 30 then displays a resulting superimposed image in the image display region 50 of the planar image display device 12. Furthermore, the CPU 30 makes the left-eye image 51a and the right-eye image 51b semi-transparent and superimposes one on the other by using the image (the left-eye image 51a or the right-eye image 51b) rotated or changed in size in step S3. The CPU 30 then displays a resulting superimposed image on the planar image display device 12. Here, the image display region 50 of the planar image display device 12 is small as compared to the screen of the stereoscopic image display device 11. Therefore, the CPU 30 reduces the left-eye image 51a and the right-eye image 51b, according to the ratio of size of the image display region 50 to the size of the screen of the stereoscopic image display device 11, and displays the left-eye image 51a and the right-eye image 51b on the planar image display device 12. Furthermore, the CPU 30 displays on the planar image display device 12 the stereoscopic image display frame 59 set by the zoom process (S34) in step S4 or the scrolling process (S45) in step S5. As described above, although the stereoscopic image 61 displayed on the stereoscopic image display device 11 is zoomed or scrolled, the images displayed on the planar image display device 12 are not zoomed or scrolled. That is, the entirety of the left-eye image 51a and the entirety of the right-eye image 51b are displayed on the planar image display device 12 even when the entirety of the stereoscopic image 61 is not displayed on the stereoscopic image display device 11 because the stereoscopic image 61 is zoomed or scrolled. This allows the user to adjust the images, while verifying the entirety of the left-eye image 51a and the entirety of the right-eye image 51b, even when the stereoscopic image 61 is zoomed or scrolled. Next, the CPU 30 executes a process step S8.

In step S8, the CPU 30 determines whether or not the adjustment is ended. The CPU 30 determines, for example, whether or not a predetermined operation has been performed by the user (whether or not any button provided on the lower housing 13b (not shown) has been pressed, for example). If the determination result is negative, the CPU 30 next executes a process of step S1. If the determination result is affirmative, the CPU 30 ends the process shown in FIG. 14. This is the end of the image display control process according to the present embodiment.

The content and the order of the above-described processes are merely illustrative. That is, the position adjustment process, the rotation/size change process, and the like are merely specific examples, and the relative positions, relative sizes, and relative rotations of the left-eye image 51a and the right-eye image 51b may be adjusted in any manner. Also, the above-described processes may be in any order.

As described above, by adjusting the positions, sizes or rotations of the left-eye image 51a and the right-eye image 51b, the user can adjust the appearance of the stereoscopic image 61. The user can adjust the positions, sizes or rotations of the left-eye image 51a and the right-eye image 51b on the screen of the planar image display device 12, while seeing the stereoscopic image 61 displayed on the stereoscopic image display device 11. Therefore, the user can easily adjust the appearance of the stereoscopic image 61.

The left-eye image 51a and the right-eye image 51b taken by another device may be loaded to the image display apparatus 10 via the stored data memory 34. Also, the left-eye image 51a and the right-eye image 51b taken by another device may be provided to the image display apparatus 10 via the communication module 35.

Also, information indicative of the amounts of adjustment in the positions, sizes, and rotations by which the left-eye image 51a and the right-eye image 51b are adjusted in step S2 and S3 may be stored in the stored data memory 34, together with the image data of the left-eye image 51a and the right-eye image 51b, respectively. The information may be stored as part of the image data of each of the left-eye image 51a and the right-eye image 51b. The stored data memory 34 may be connected to another apparatus different from the image display apparatus 10, and the stereoscopic image, which is adjusted by using the image data stored in the stored data memory 34 and the information indicative of the amounts of adjustment, may be displayed on a screen of the another apparatus.

Further, in the above embodiment, even when the stereoscopic image is zoomed or scrolled, the planar image (including the left-eye image 51a and the right-eye image 51b) displayed on the planar image display device 12 are not zoomed or scrolled. In another embodiment, when the stereoscopic image is zoomed or scrolled, the planar image displayed on the planar image display device 12 may also be zoomed or scrolled. That is, in another embodiment, by performing scrolling or zooming of the stereoscopic image, respective portions of the left-eye image 51a and the right-eye image 51b displayed on the planar image display device 12 may be displayed on the planar image display device 12 (the entirety of the left-eye image 51a and the entirety of the right-eye image 51b may not be displayed).

Figure 19:
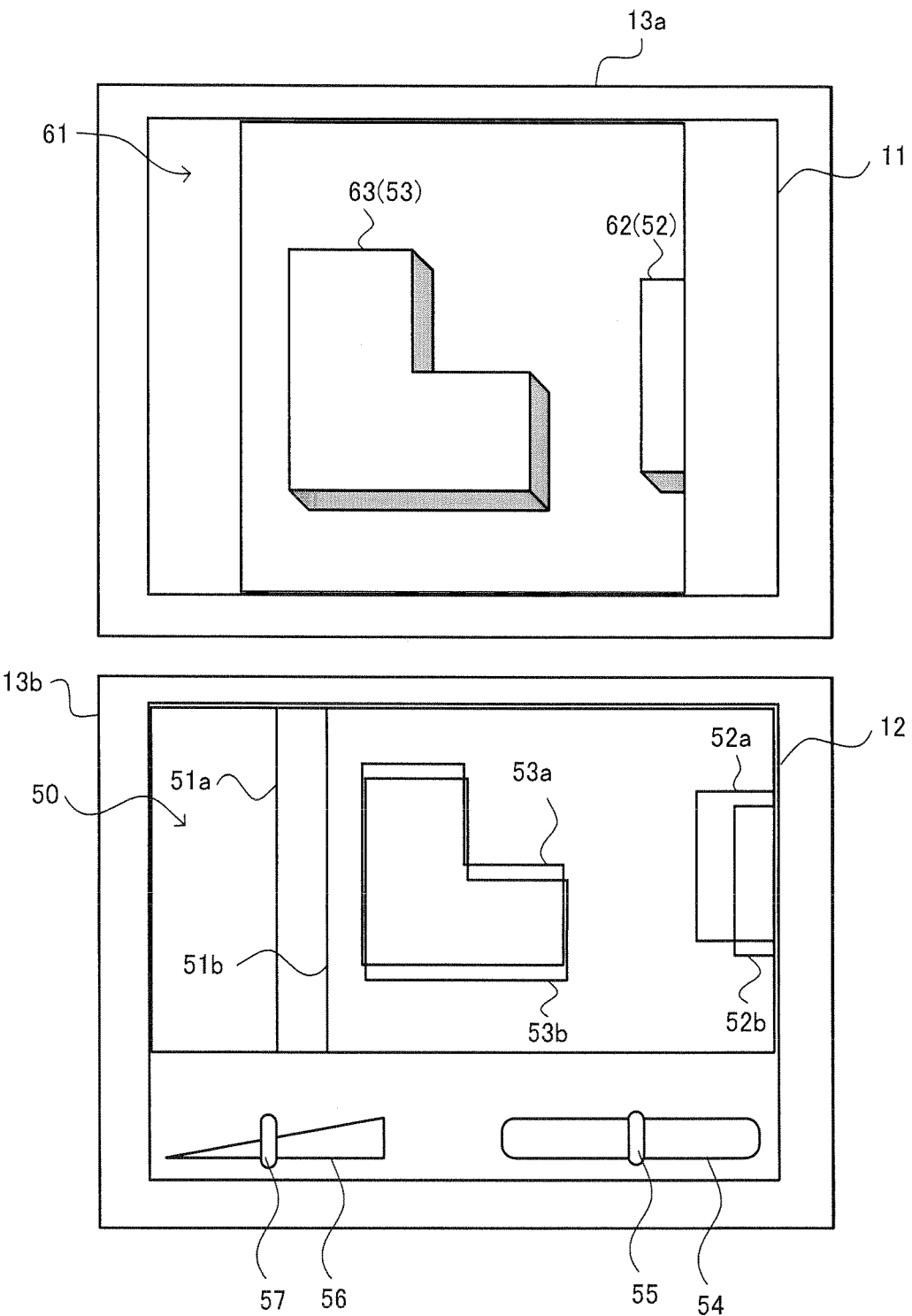
FIG. 19 is a diagram illustrating a state in which the left-eye image 51a and the right-eye image 51b displayed on the planar image display device 12 are zoomed or scrolled in response to performing zooming or scrolling of the stereoscopic image 61.

Specifically, as shown in FIG. 19, by performing scrolling or zooming of the stereoscopic image 61, the left-eye image 51a and the right-eye image 51b displayed on the planar image display device 12 may also be zoomed or scrolled. FIG. 19 is a diagram illustrating a state in which the left-eye image 51a and the right-eye image 51b displayed on the planar image display device 12 are zoomed or scrolled in response to performing zooming or scrolling of the stereoscopic image 61. In FIG. 19, by performing zooming or scrolling of the stereoscopic image 61, portions of the left-eye image 51a and the right-eye image 51b are made semi-transparent, superimposed one on the other, and displayed on the planar image display device 12. Specifically, in FIG. 19, a portion where the left-eye image 51a and the right-eye image 51b are superimposed one on the other and a portion where the left-eye image 51a and the right-eye image 51b are not superimposed one on the other are displayed on the screen of the planar image display device 12. Also, a stereoscopic image, which corresponds to the portion where the left-eye image 51a and the right-eye image 51b are superimposed one on the other, is displayed on the screen of the stereoscopic image display device 11. As shown in FIG. 19, the left-eye image 51a and the right-eye image 51b displayed on the planar image display device 12 are enlarged by the same ratio as the magnification ratio of the stereoscopic image 61. Since the screen of the stereoscopic image display device 11 is large as compared to the image display region 50 of the planar image display device 12, the object image 63 is displayed larger than the object images 53a and 53b. The left-eye image 51a and the right-eye image 51b displayed on the planar image display device 12 are scrolled in response to performing scrolling of the stereoscopic image 61. That is, the images displayed on the planar image display device 12 are the same as the image displayed on the stereoscopic image display device 11. As described above, similar to the stereoscopic image displayed on the stereoscopic image display device 11, the planar image displayed on the planar image display device 12 is also zoomed and/or scrolled, and thereby it is easy for the user to understand the correspondence between the stereoscopic image and the planar image.

Further, in the above embodiment, the image, in which the left-eye image 51a and the right-eye image 51b are made semi-transparent and superimposed one on the other, is displayed on the planar image display device 12. In another embodiment, the images may be displayed in any manner if the amounts of shift (amounts of shift in positions, sizes and rotations) of the left-eye image 51a and the right-eye image 51b are recognizable to the user. For example, the contours of the two images may be highlighted so as to be recognizable to the user, and the two images may be superimposed one on the other without being made semi-transparent. That is, one image may be displayed over another image so that the one image hides a portion of the other image.

Any operation, not limited to the above-described operation, may be performed to adjust the positions, sizes, or rotations of the left-eye image 51a and/or the right-eye image 51b. For example, a button (cross button or the like) may be provided on the lower housing 13b, and the positions of the left-eye image 51a and/or the right-eye image 51b may be adjusted by using the button. Specifically, for example, in the case where is the image to be moved is selected by using the stick 16, and if a right-direction button of the cross button is pressed, the selected image may be moved in the rightward direction, and if a left-direction button is pressed, the selected image may be moved in the leftward direction. Furthermore, for example, in the case where the image to be rotated is selected by using the stick 16, and if the right-direction button of the cross button is pressed, the selected image may be rotated in the clockwise direction, and if the left-direction button is pressed, the selected image may be rotated in the anticlockwise direction. Further, for example, in the case where the image to be enlarged or reduced is selected by using the stick 16, and if an up-direction button of the cross button is pressed, the selected image may be enlarged, and if a down-direction button is pressed, the selected image may be reduced.

Further, while the display configured to display a stereoscopic image which can be viewed by the naked eye is employed in the present embodiment, the present invention is applicable to achieving the stereoscopic vision which requires glasses having the time division scheme or the deflecting scheme, the anaglyphic format (the red-blue glasses format), or the like.

Second Embodiment

Next, a second embodiment will be described. In the second embodiment, the image display apparatus 10 described above also operates as a game apparatus. On a lower housing 13b of the image display apparatus 10 according to the second embodiment, a plurality of operation buttons (a cross button and other buttons), which are operated by a user, are provided.

The image display apparatus 10 according to the second embodiment operates in a first mode and a second mode. In the first mode, as described in the first embodiment, images which are taken by using a left-eye image imaging section 18a and a right-eye image imaging section 18b are used, and a stereoscopic image is displayed on the stereoscopic image display device 11. In the second mode, images taken by a virtual stereo camera are used, and a stereoscopic image is displayed, in real time, on a stereoscopic image display device 11. In the second mode, the images taken of a virtual space by the virtual stereo camera (a left-eye virtual camera and a right-eye virtual camera) are displayed on the stereoscopic image display device 11. In the second mode, the virtual stereo camera takes images of a three-dimensional virtual space, and thereby a left-eye image and a right-eye image, which has a predetermined parallax therebetween, are generated. The image display apparatus 10 synthesizes the left-eye image and the right-eye image in which the virtual space is taken in real time, thereby displays, in real time, the stereoscopic image on the stereoscopic image display device 11.

In the second mode, for example, a role-playing game is assumed, in which a story advances such that a player character operated by the user explores the three-dimensional virtual space. In the role-playing game, various game scenes (for example, a scene in which the player character explores a cave, or a scene in which the player character explores a forest) are prepared. For the virtual stereo camera, settings (such as a zoom setting, setting of a focus position, a setting of a distance between the left-eye virtual camera and the right-eye virtual camera) are previously made depending on the various game scenes. For example, for the scene in which the player character explores the cave, the distance between the left-eye virtual camera and the right-eye virtual camera is previously set to a first distance, and for the scene in which the player character explores the forest, the distance between the left-eye virtual camera and the right-eye virtual camera is previously set to a second distance.

The distance of the two virtual cameras (the left-eye virtual camera and the right-eye virtual camera) influences the appearance of various three-dimensional objects (a rock object, a tree object, and the like, for example), which are present in the three-dimensional virtual space, in the depth direction. For example, in the case where the distance between the two virtual cameras is relatively long, and if an image of the three-dimensional object is taken, the stereoscopic image, which has the three-dimensional object being longer in the depth direction, is displayed. The distance between the two virtual cameras is previously determined by a game architect, according to each scene of the game.

Here, in the second embodiment, the distance between the two virtual cameras is adjusted according to a position of a hardware slider 14 (see FIG. 1) of the image display apparatus 10. That is, the user of the image display apparatus 10 can adjust, by using the hardware slider 14, the distance between the two virtual cameras to make the stereoscopic image easy to see for the user. Specifically, for example, if the hardware slider 14 is positioned at the center of a range of movement thereof, the distance between the two virtual cameras is set to a predetermined value (a default value). Also, for example, if the hardware slider 14 is positioned at the right end of the range of movement thereof, the distance between the two virtual cameras is set to 125% of the default value. Furthermore, for example, if the hardware slider 14 is positioned at the left end of the range of movement thereof, the distance between the two virtual cameras is set to 75% of the default value.

As described above, in the second embodiment, the user can adjust the distance between the two virtual cameras by using the hardware slider 14. This allows the user to adjust the appearance of the stereoscopic image.

In the first mode, since the distance between the left-eye image imaging section 18a and the right-eye image imaging section 18b cannot be adjusted, the hardware slider 14 is used as a switch to switch between whether or not to display the stereoscopic image on the stereoscopic image display device 11. In the first mode, for example, if the hardware slider 14 is positioned at the right end, the stereoscopic image is displayed on the stereoscopic image display device 11, and if the hardware slider 14 positioned at the left end, the stereoscopic image is not displayed on the stereoscopic image display device 11. When the stereoscopic image is not displayed on the stereoscopic image display device 11, image may not be displayed on the stereoscopic image display device 11, or a planar image may be displayed.

Figure 20:
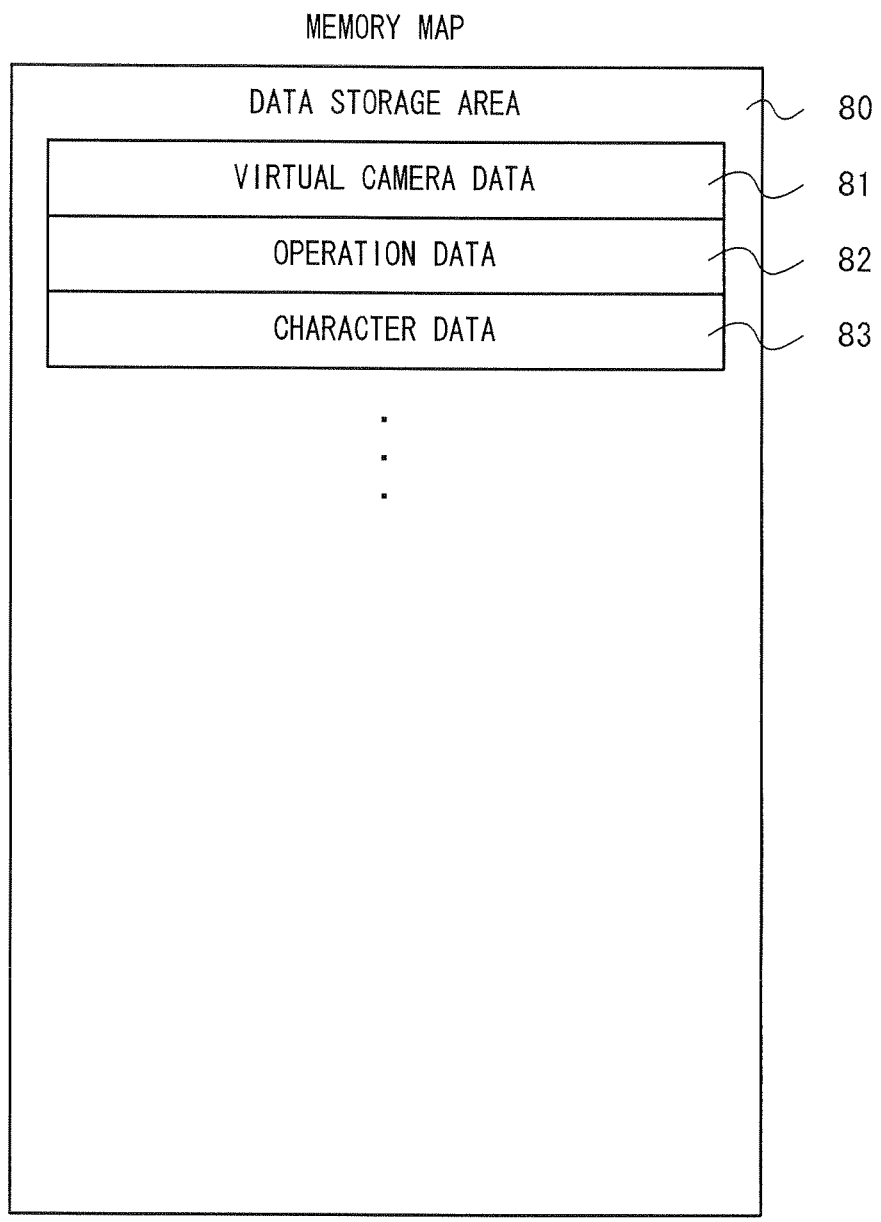
FIG. 20 is a diagram illustrating a memory map of a main memory 31 of an image display apparatus 10 according to a second embodiment.

Next, a process performed in the image display apparatus 10 according to the second embodiment will be described in detail. Initially, main data stored in a main memory 31 during the process will be described. FIG. 20 is a diagram illustrating a memory map of the main memory 31 of the image display apparatus 10 according to the second embodiment. As shown in FIG. 20, a data storage area 80 is provided in the main memory 31. In the data storage area 80, virtual camera data 81, operation data 82, character data 83, and the like, are stored. Other data stored in the main memory 31 are a program for executing the above-described process, image data of the various objects appear in the game, and the like.

The virtual camera data 81 is data regarding setting of the virtual stereo camera present in a game space. The setting of the virtual stereo camera includes the distance between the left-eye virtual camera and the right-eye virtual camera, which are components of the virtual stereo camera, the zoom setting of the virtual stereo camera, positions of respective points of views of the virtual stereo camera, and the like.

The operation data 82 is data indicative of inputs to the plurality of operation buttons (not shown). When each operation button is pressed by the user, data which indicates that the operation button has been pressed is stored in the main memory 31.

The character data 83 is data regarding the player character which is operated by the user and which is present in the game space, and includes the position of the player character in the game space and the character information of the player character.

Figure 21:
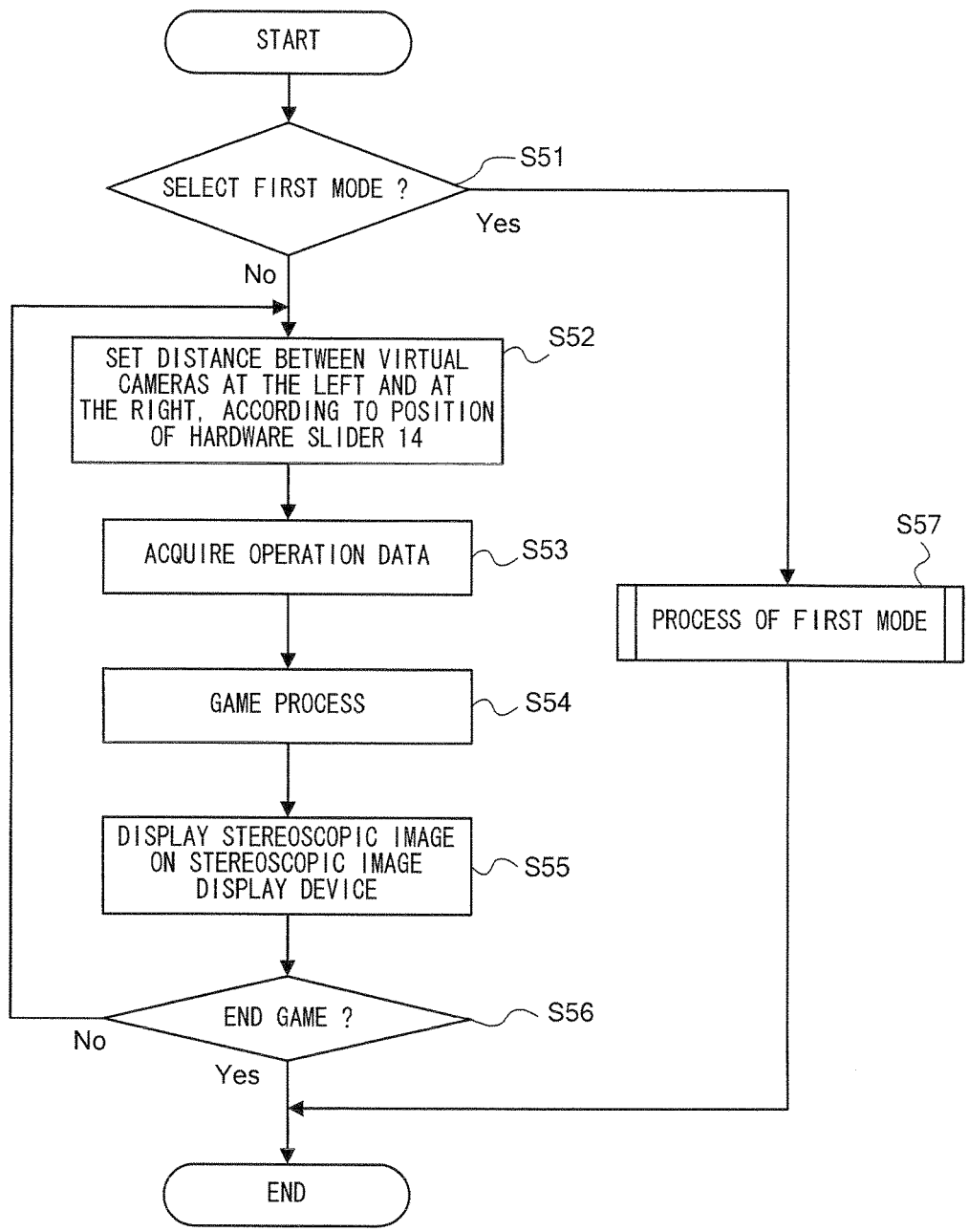
FIG. 21 is a main flowchart illustrating in detail a process according to the second embodiment.

Next, the process according to the second embodiment will be described in detail, with reference to FIG. 21. FIG. 21 is a main flowchart showing in detail the process according to the second embodiment. When the image display apparatus 10 is powered on, a CPU 30 of the image display apparatus 10 executes a boot program stored in a ROM 32 to initialize each unit, such as the main memory 31. Next, the program stored in the ROM 32 is loaded into the main memory 31, and the CPU 30 starts executing the program. The program may be stored in the stored data memory 34, or provided to the image display apparatus 10 via the communication module 35. The flowchart shown in FIG. 21 shows a process performed after the process is completed. In FIG. 21, the description of processes, which do not directly relate to the present invention, is omitted. A processing loop of step S52 through step S56 shown in FIG. 21 is repeatedly executed for each frame (for example, $\frac{1}{30}$ second, which is referred to as frame time).

Initially, in step S51, the CPU 30 determines whether or not the first mode has been selected. Specifically, the CPU 30 displays a screen, which allows the user to select the first mode or the second mode, on the planar image display device 12 and detects an input from the user. If the first mode has been selected by the user, the CPU 30 next executes a process of step S57. On the other hand, if the second mode has been selected by the user, the CPU 30 next executes a process of step S52.

In step S52, the CPU 30 sets the distance between the left-eye virtual camera and the right-eye virtual camera, according to the position of the hardware slider 14. Specifically, the CPU 30 detects the position of the hardware slider 14 to calculate the distance between the two virtual cameras, and stores the obtained data in the main memory 31 as the virtual camera data 81. The CPU 30 next executes a process of step S53.

In step S53, the CPU 30 acquires the operation data. Specifically, the CPU 30 refers to the main memory 31 to acquire the operation data regarding the plurality of operation buttons. The CPU 30 next executes a process of step S54.

In step S54, the CPU 30 executes a game process. Specifically, the CPU 30 updates the position of the player character in the game space, causes the player character to perform a predetermined movement, and the like, based on the operation data acquired in step S53. Further, the CPU 30 causes objects, other than the player character, which are present in the game space, to perform the predetermined movement. Furthermore, the CPU 30 updates the positions of the respective points of views of the virtual stereo camera, updates the zoom setting, and the like. The CPU 30 next executes a process of step S55.

In step S55, the CPU 30 displays the stereoscopic image on the stereoscopic image display device 11. Specifically, the CPU 30 takes images of the game space by the virtual stereo camera to acquire the left-eye image and the right-eye image. The CPU 30 then synthesizes the left-eye image and the right-eye image to generate stereoscopic image data, and displays the stereoscopic image on the stereoscopic image display device 11. The CPU 30 next executes a process of step S56.

In step S56, the CPU 30 determines whether or not the game is ended. For example, the CPU 30 determines whether or not a button (one of the plurality of operation buttons), which indicates that the game is ended, has been pressed by the user. If the determination result is negative, the CPU 30 executes again the process of step S52. If the determination result is affirmative, the CPU 30 ends the process shown in FIG. 21.

Figure 22:
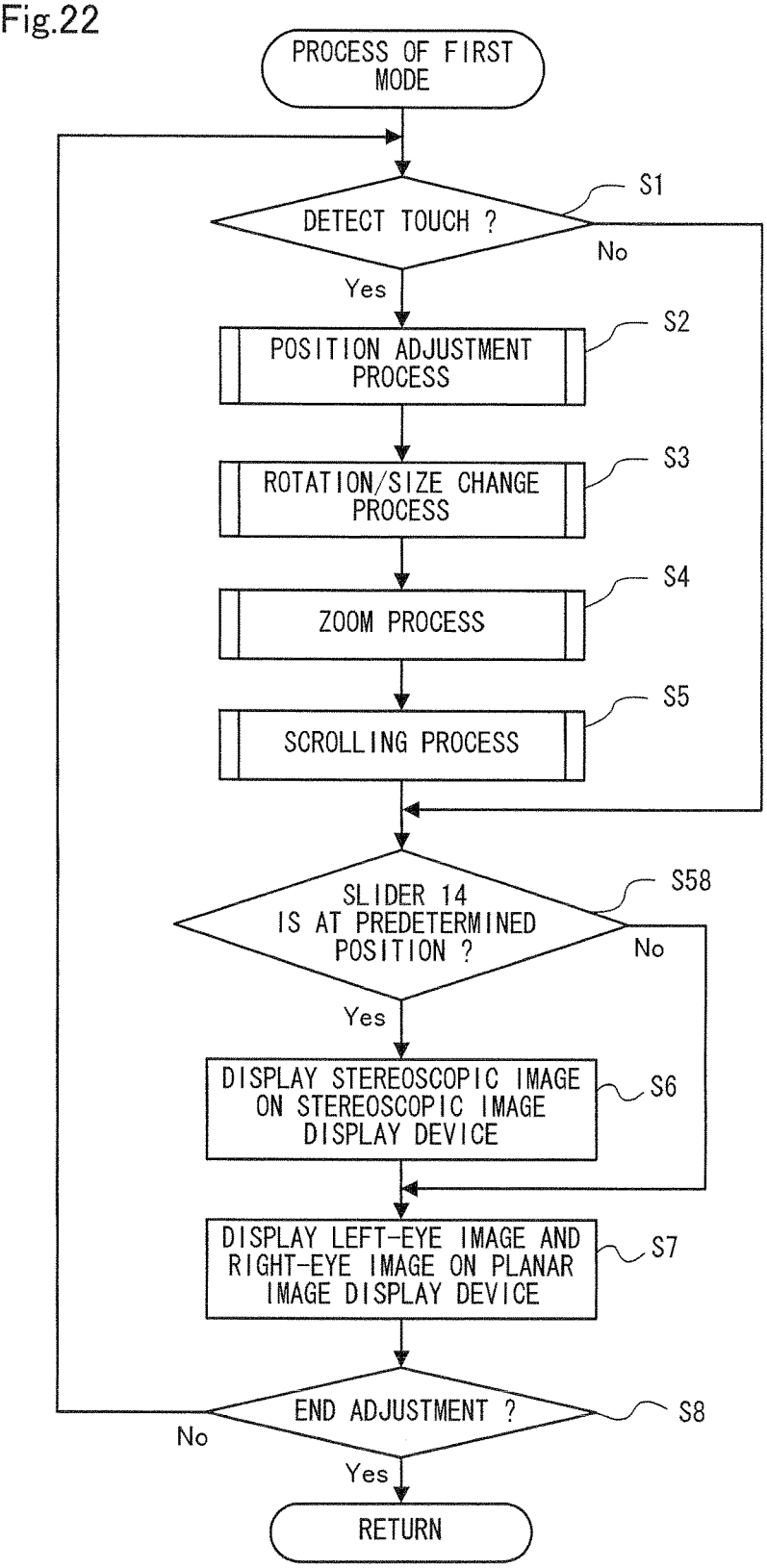
FIG. 22 is a flowchart illustrating in detail a process of a first mode.

In step S57, the CPU 30 executes the process of the first mode. Although the process of step S57 is the same as the process (the steps S1 to S8 shown in FIG. 14) in the first embodiment, a determination process of step S58 is performed between the step S5 and step S6 in FIG. 14, as shown in FIG. 22. FIG. 22 is a flowchart showing in detail the process of the first mode. In step S58, the CPU 30 determines whether or not the hardware slider 14 is positioned at a predetermined position (the right end, for example). If the determination result is affirmative, the CPU 30 next executes a process of step S6. If the determination result is negative, the CPU 30 next executes a process of step S7.

As described above, in the second embodiment, the image display apparatus 10 operates in the first mode, in which the stereoscopic image is displayed by using the left-eye image and the right-eye image which are already taken, and in the second mode in which the stereoscopic image is displayed by using the left-eye image and the right-eye image taken by the virtual stereo camera present in the virtual space.

In the first mode, the left-eye image and the right-eye image may be the images taken by the stereo camera 18 (the left-eye image imaging section 18*a* and the right-eye image imaging section 18*b*), or images taken by another stereo camera. In the first mode, since the images, which are already taken, are used, the parallax caused by the distance between the left-eye image imaging section 18*a* and the right-eye image imaging section 18*b* cannot be changed. Therefore, in the first mode, the hardware slider 14 functions as a switch to switch between displaying/not displaying the stereoscopic image. This allows the user to switch between ON/OFF of the stereoscopic display by using the hardware slider 14.

On the other hand, in the second mode, since the left-eye image and the right-eye image are the images taken by the virtual stereo camera (the left-eye virtual camera and the right-eye virtual camera), the distance between the left-eye virtual camera and the right-eye virtual camera can be arbitrarily changed. In the second mode, the distance between the virtual cameras (the distance between the left-eye virtual camera and the right-eye virtual camera) is changed by using the hardware slider 14. Therefore, the user can adjust the appearance of the stereoscopic image. Furthermore, the distance between the virtual cameras can be changed from the default value, according to the position of the hardware slider 14, and thus the user need not to adjust the hardware slider 14, according to the game scene. That is, the default value of the distance between the virtual cameras, which is set for each game scene, is previously determined by the architect. Therefore, the stereoscopic image taken with such settings of the virtual cameras does not necessarily cause no sense of discomfort for all users. For example, it may be easy for a certain user to see the image as the stereoscopic image, when the distance between the virtual cameras is set to 80% of the default value in each game scene. Therefore, setting the ratio of the value of the distance between the virtual cameras to the default value, according to the position of the hardware slider 14 obviates the need for adjusting the position of the hardware slider 14 in each game scene.

In the second mode, the amount of shift of the left-eye image and the right-eye image in the horizontal direction may be set according to the position of the hardware slider 14. That is, the amount of shift of the left-eye image and the right-eye image in the horizontal direction may be adjusted, according to the position of the hardware slider 14, instead of adjusting the distance between the virtual cameras.

Also, even in the second mode, the amount of shift of the left-eye image and the right-eye image (the amount of shift in the horizontal direction) may be adjusted by using the position adjustment bar 54, as described in the first embodiment. This allows the user to move a predetermined object present in the game space in a direction perpendicular to the screen of the stereoscopic image display device 11.

Furthermore, in the first and second embodiments, the image display apparatus 10 having a handheld type, which includes both the stereoscopic image display device 11 and the planar image display device 12, is assumed. In another embodiment, these devices may be configured to be independently of one another and connected to one another. For example, a first display device capable of displaying a stereoscopically visible image, a second display device configured to display merely a planar image, and a control apparatus which performs the processes described above may be configured to be hardware independently of one another. Then, these devices and apparatus may function as the image display control system by being connected with one another by wire or wirelessly.

Further, in another embodiment, a display device capable of setting simultaneously a stereoscopic image display area, in which a stereoscopic image is displayed, and a planar image display area, in which a planer images is displayed, may be employed as the stereoscopic image display device 11 and the planar image display device 12, respectively. That is, the stereoscopic image display area and the planar image display area of such display devices may be employed as stereoscopic image display means, and planar image display means, respectively.

Further, in another embodiment, the adjustment method described above may be applied to any information processing apparatus, which includes a display device and a touch panel (for example, PDAs (Personal Digital Assistant), mobile phones, and the like), and personal computers which include a pointing device such as a mouse.

Further, in the embodiment described above, the stereoscopic image is adjusted (the respective positions of the left-eye image and the right-eye image are adjusted), the stereoscopic image is zoomed, scrolled, and the like, by the operations on the touch panel. In another embodiment, a pointing device, such as a mouse, may be operated to adjust the stereoscopic image, and the like. For example, the slider of the position adjustment bar, which is displayed on the screen, may be adjusted by a mouse operation.

Further, in the embodiment described above, the processes shown in the above-described flowcharts are performed by the CPU 30 of the image display apparatus 10 executing a predetermined program. In another embodiment, a part or the entirety of the processes may be performed by a dedicated circuit included in the image display apparatus 10. For example, a dedicated GPU (Graphics Processing Unit) or the like, which generates an image to be displayed on the stereoscopic image display device 11, may be provided.

While the present invention has been described in detail, the foregoing description is in all aspects illustrative and not restrictive. It is understood that numerous other adjustments and variations can be devised without departing from the scope of the invention.

What is claimed is:

1. A handheld electronic device comprising:
   a 3D display area on which a stereoscopically visible image can be displayed by using a right-eye image and a left-eye image which have a parallax therebetween;
   a 2D display area on which a planar image can be displayed, the planar image including a position adjustment control for adjusting an amount of shift in relative positions between the left eye image and the right eye image; and
   a touch panel for detecting user input on the 2D display area corresponding to the position adjustment control to adjust the amount of shift in relative positions between the left eye image and the right eye image so as to adjust the parallax.

2. The electronic device according to claim 1, wherein:
   the position adjustment control of the planar image displayed on the 2D display includes a slider image which is adjustable based on the user input detected by the touch panel so as to adjust the parallax.

3. The electronic device according to claim 1, wherein:
   the 2D display area and the touch panel are below the 3D display area.

4. The electronic device according to claim 1, wherein:
   the stereoscopically visible image is stereoscopically visible by naked eyes.

5. The electronic device according to claim 1, wherein:
   the stereoscopically visible image is stereoscopically visible without requiring use of user glasses.

6. The electronic device according to claim 1, further comprising a parallax barrier through which stereoscopically visible image is viewable.

7. The electronic device according to claim 1, further comprising a stereo camera for taking the right-eye image and the left-eye image.

8. The electronic device according to claim 1, wherein the right-eye image and the left-eye image are taken by two virtual cameras.

9. The electronic device according to claim 8, wherein the parallax is adjusted by adjusting a distance between the two virtual cameras based on the user input.

10. The electronic device according to claim 1, further comprising a mode selector for selecting either of:
    a first mode in which the right-eye image and the left-eye image, which are taken by a stereo camera, are used; and
    a second mode in which the right-eye image and the left-eye image, which are taken of a virtual space using two virtual cameras, are used.

11. The electronic device according to claim 1, further comprising a switch configured to switch on/off a display of the stereoscopically visible image on the 3D display area.

12. A handheld electronic device comprising:
    a 3D display area for displaying a stereoscopic image;
    a 2D display area for displaying a planar image, the planar image including a position adjustment control for adjusting an amount of shift in relative positions between the left eye image and the right eye image; and
    a touch panel for detecting user input on the 2D display area corresponding to the position adjustment control to adjust the amount of shift in relative positions between the left eye image and the right eye image so as to adjust a stereoscopic effect of the stereoscopic image displayed by the 3D display area.

13. The electronic device according to claim 12, wherein:
    the position adjustment control of the planar image displayed on the 2D display includes a slider image which is adjustable based on the user input detected by the touch panel so as to adjust the stereoscopic effect of the stereoscopic image displayed by the 3D display area.

14. The electronic device according to claim 12, wherein:
    the 2D display area and the touch panel are below the 3D display area.

15. The electronic device according to claim 12, wherein:
    the stereoscopic image is stereoscopically visible by naked eyes.

16. The electronic device according to claim 12, wherein:
    the stereoscopic image is stereoscopically visible without requiring use of user glasses.

17. The electronic device according to claim 12, further comprising a parallax barrier through which the stereoscopic image is viewable.

18. The electronic device according to claim 12, further comprising a stereo camera.

19. The electronic device according to claim 12, wherein the right-eye image and the left-eye image are taken by two virtual cameras.

20. The electronic device according to claim 19, wherein the stereoscopic effect is adjusted by adjusting a distance between the two virtual cameras based on the user input.

21. The electronic device according to claim 12, further comprising a mode selector for selecting either of:
    a first mode using a stereo camera; and
    a second mode using two virtual cameras.

22. The electronic device according to claim 12, further comprising a switch configured to switch on/off a display of the stereoscopic image on the 3D display area.

23. A handheld electronic device comprising:
    a 3D display area on which a stereoscopically visible image can be displayed by using a right-eye image and a left-eye image which have a parallax therebetween;
    a 2D display area on which a planar image can be displayed, the planar image including a position adjustment control for adjusting an amount of shift in relative positions between the left eye image and the right eye image; and
    a touch panel for detecting user input on the 2D display area corresponding to the position adjustment control to adjust the amount of shift in relative positions between the left eye image and the right eye image so as to adjust the parallax,
    wherein the planar image also includes a zoom control for enlarging or reducing the stereoscopically visible image displayed on the 3D display area.

24. A handheld electronic device comprising:
    a 3D display area on which a stereoscopically visible image can be displayed by using a right-eye image and a left-eye image which have a parallax therebetween;
    a 2D display area on which a planar image can be displayed, the planar image including a position adjustment control for adjusting an amount of shift in relative positions between the left eye image and the right eye image; and
    a touch panel for detecting user input on the 2D display area corresponding to the position adjustment control to adjust the amount of shift in relative positions between the left eye image and the right eye image so as to adjust the parallax,
    wherein the planar image also includes an image display region showing the right-eye image and the left-eye image shifting in relative positions upon detection of the user input on the 2D display area corresponding to the position adjustment control.

25. A handheld electronic device comprising:
a 3D display area for displaying a stereoscopic image;
a 2D display area for displaying a planar image, the planar image including a position adjustment control for adjusting an amount of shift in relative positions between the left eye image and the right eye image; and
a touch panel for detecting user input on the 2D display area corresponding to the position adjustment control to adjust the amount of shift in relative positions between the left eye image and the right eye image so as to adjust a stereoscopic effect of the stereoscopic image displayed by the 3D display area,
wherein the planar image also includes a zoom control for enlarging or reducing the stereoscopically visible image displayed on the 3D display area.

26. A handheld electronic device comprising:
a 3D display area for displaying a stereoscopic image;
a 2D display area for displaying a planar image, the planar image including a position adjustment control for adjusting an amount of shift in relative positions between the left eye image and the right eye image; and
a touch panel for detecting user input on the 2D display area corresponding to the position adjustment control to adjust the amount of shift in relative positions between the left eye image and the right eye image so as to adjust a stereoscopic effect of the stereoscopic image displayed by the 3D display area,
wherein the planar image also includes an image display region showing the right-eye image and the left-eye image shifting in relative positions upon detection of the user input on the 2D display area corresponding to the position adjustment control.

* * * * *